United States Patent [19]

Shingleton

[11] Patent Number: 5,227,618

[45] Date of Patent: Jul. 13, 1993

[54] VARIABLY PRESSURABLE SUPPORT AND TRACKING APPARATUS AND METHOD FOR TRACKING MOVING RADIATION SOURCE

[76] Inventor: Jefferson Shingleton, 7322 Parcell Rd., Auburn, N.Y. 13021

[21] Appl. No.: 842,965

[22] Filed: Feb. 28, 1992

[51] Int. Cl.[5] .............................. G01J 1/20; F24J 2/38
[52] U.S. Cl. .................... 250/203.4; 126/602
[58] Field of Search ............... 250/203.4, 203.3, 203.1, 250/216, 203.6; 126/425, 424, 450, 451; 359/878, 849; 251/61, 61.2

[56] References Cited

U.S. PATENT DOCUMENTS

| | | | |
|---|---|---|---|
| 2,712,772 | 7/1955 | Trombe | 250/203.4 |
| 3,967,809 | 7/1976 | Skantar | 251/61.2 |
| 4,033,676 | 7/1977 | Brantley, Jr. et al. | 126/425 |
| 4,063,543 | 12/1977 | Hedger | 250/203.4 |
| 4,147,414 | 4/1979 | Raser | 359/878 |
| 4,283,588 | 8/1981 | Zitzelsberger | 136/246 |
| 4,283,887 | 8/1981 | Horton et al. | 126/424 |
| 4,328,789 | 5/1982 | Nelson | 126/425 |
| 4,424,802 | 1/1984 | Winders | 250/203.4 |
| 4,487,196 | 12/1984 | Murphy | 126/438 |
| 4,601,282 | 7/1986 | Mountain | 250/203.4 |
| 4,762,298 | 8/1988 | Wood | 248/179 |
| 4,918,920 | 4/1990 | Duroux | 359/878 |

FOREIGN PATENT DOCUMENTS 0001003 11/1979 World Int. Prop. O. ....... 250/203.4

Primary Examiner—David C. Nelms
Assistant Examiner—Michael Messinger
Attorney, Agent, or Firm—Oliff & Berridge

[57] ABSTRACT

A variably pressurizable support system for supporting and orienting a radiation detector, and a method for orienting a radiation detector on a moving radiation source are disclosed. The support system comprises at least one pressurizable support membrane, at least one pressurizing means able to variably pressurize the support membrane, and a control apparatus for determining the desired orientation of the radiation detector and varying the pressure in the support membrane. The method of orienting the radiation detector on the radiation source comprises the steps of determining an actual orientation of the radiation detector, and a desired orientation of the detector, and operating the support system so as to minimize the difference between the desired and actual orientation. A statically pressurized, inflatable support system for supporting the radiation detector in a fixed relation to ground is disclosed. The inflatable support means have sufficient structural strength to maintain the fixed relation to ground without the need for additional structural members.

35 Claims, 28 Drawing Sheets

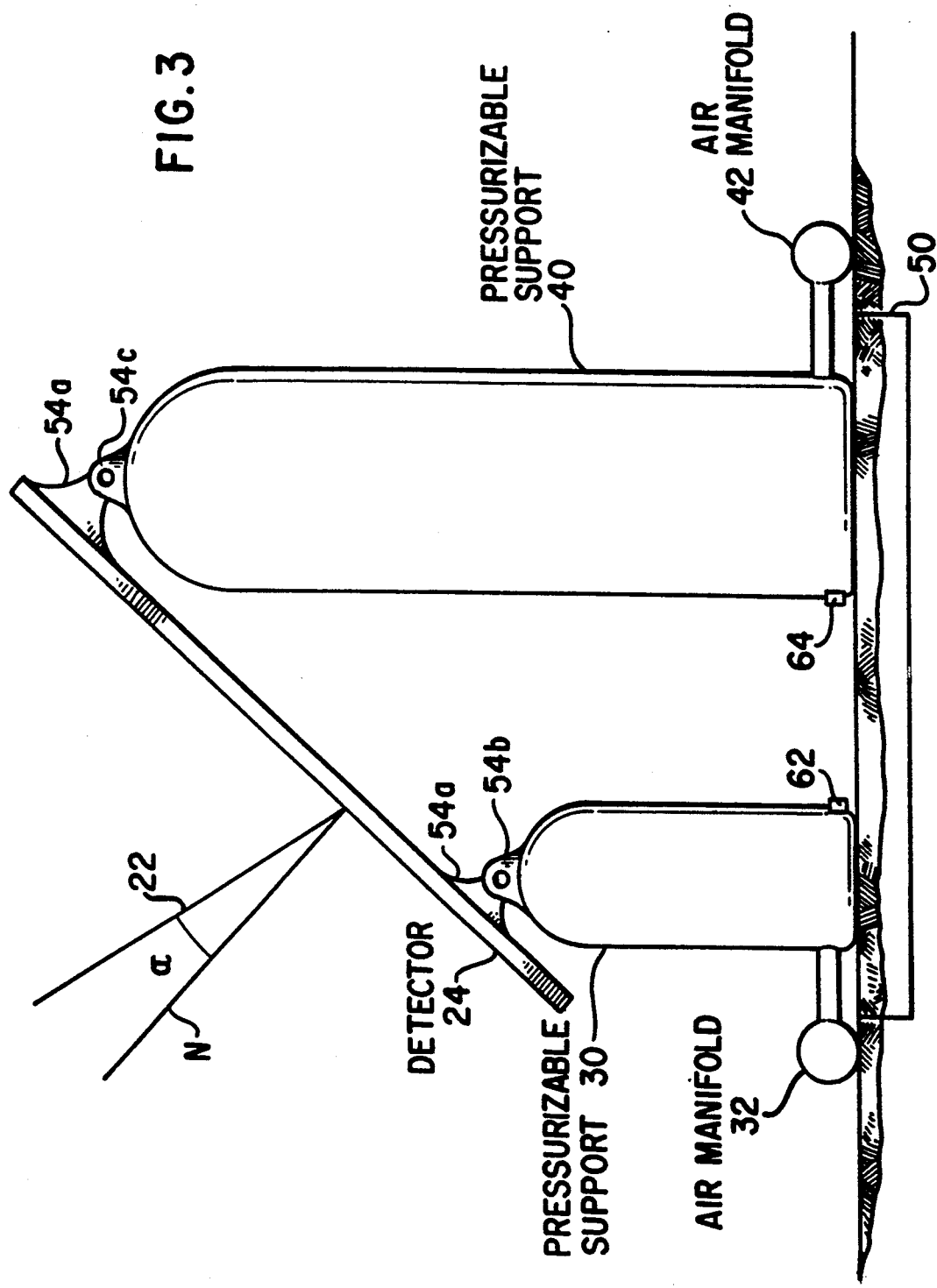

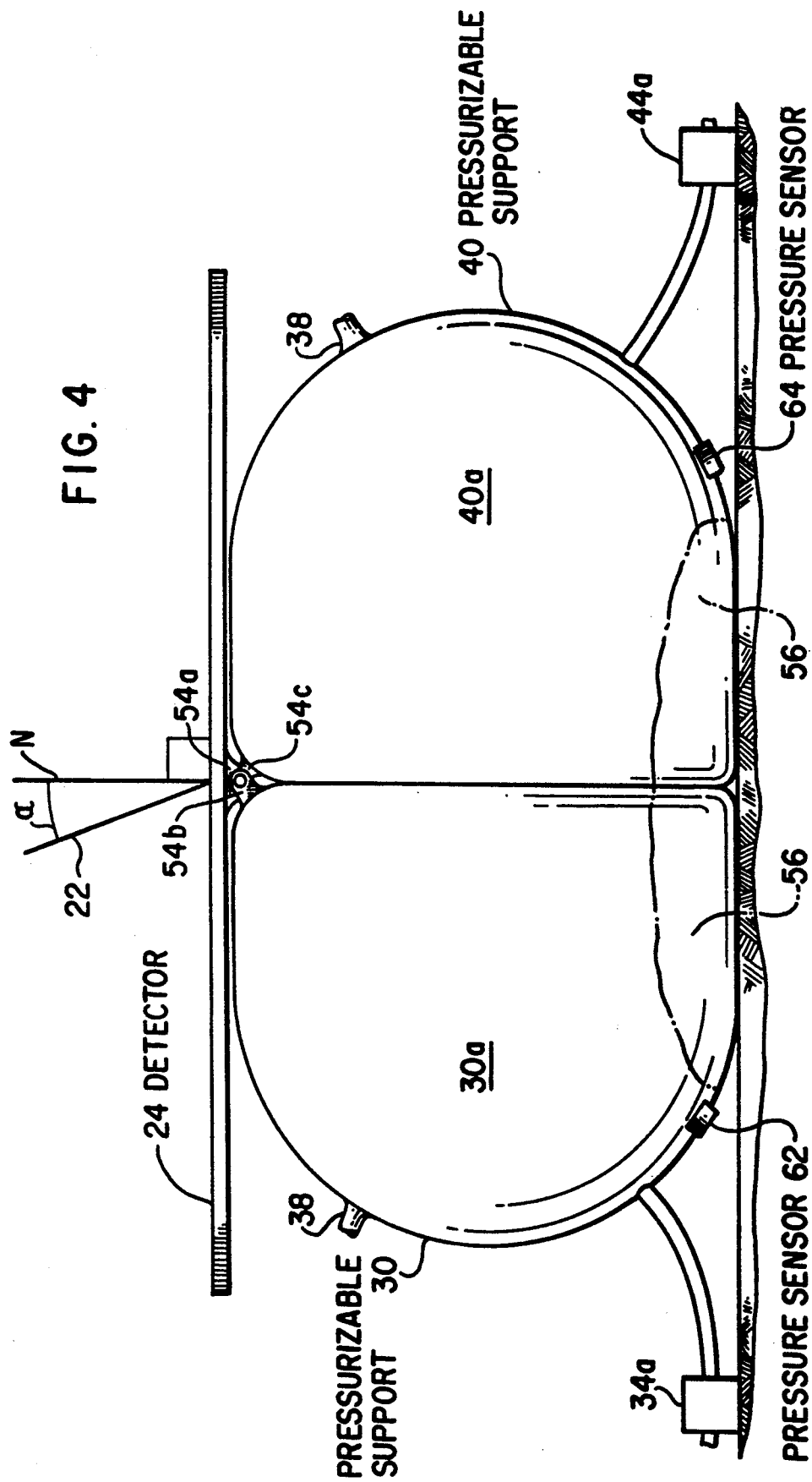

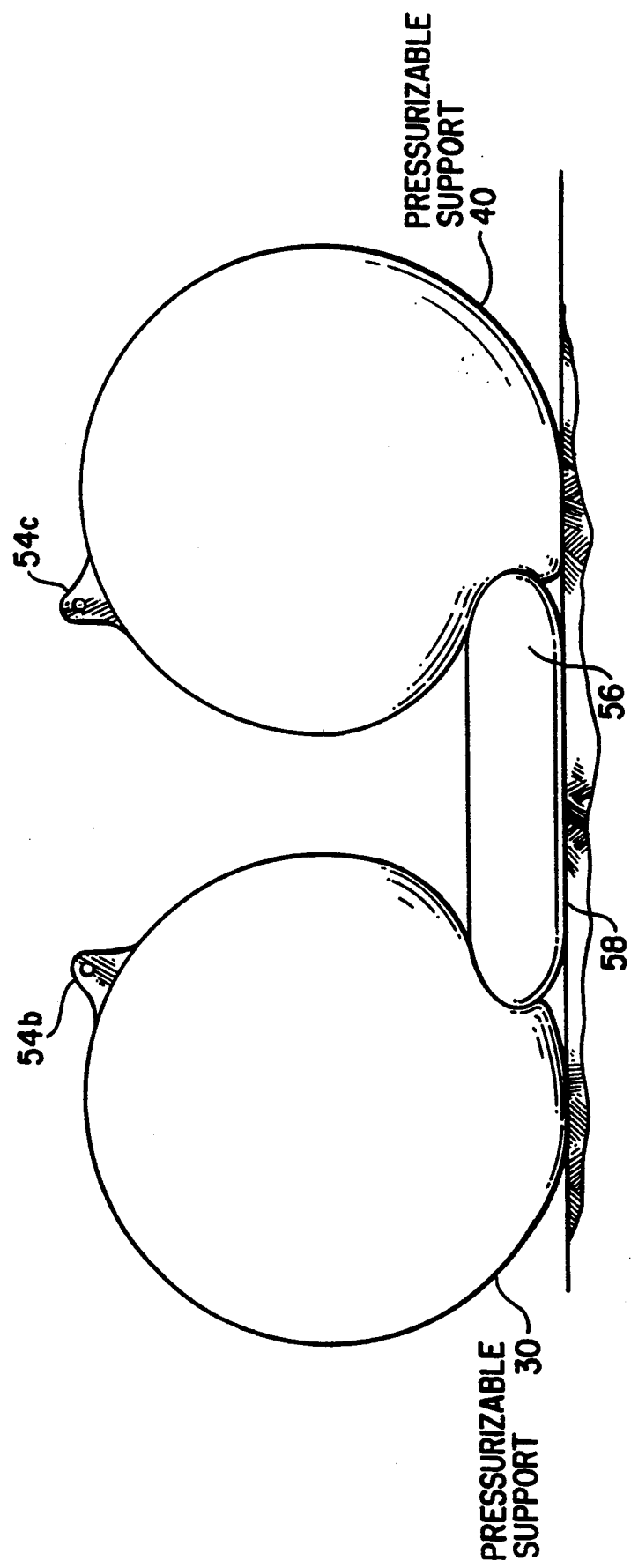

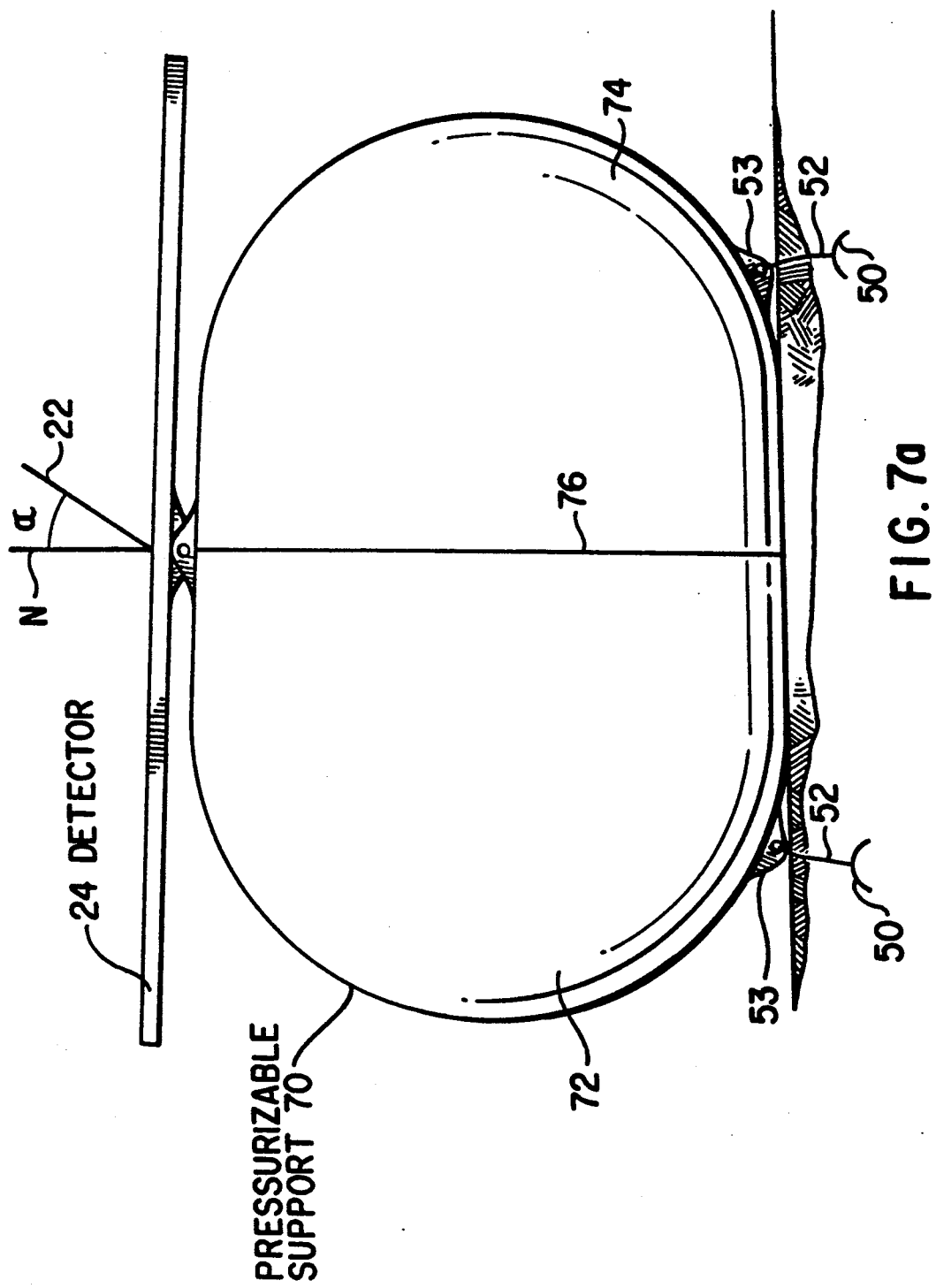

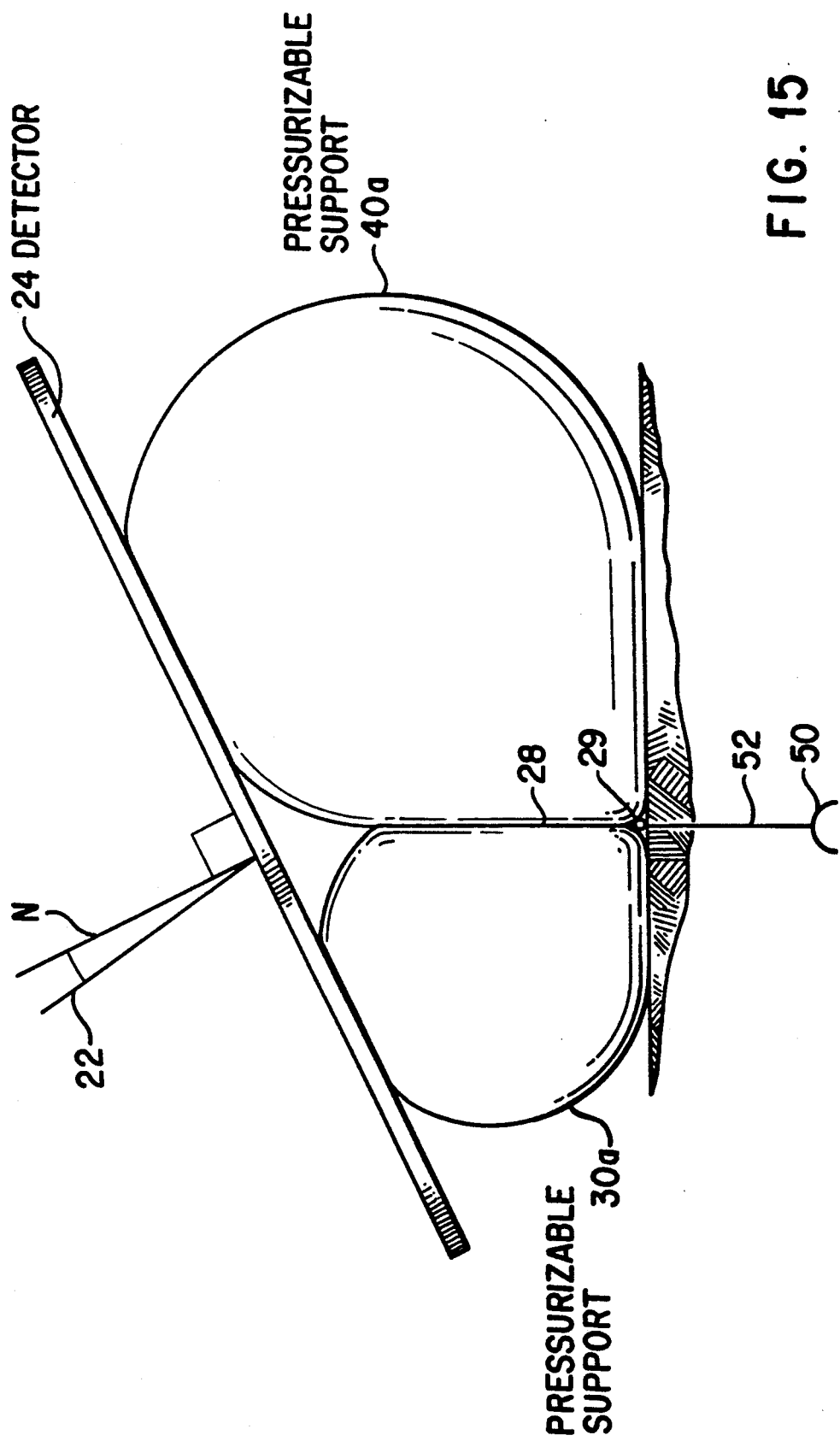

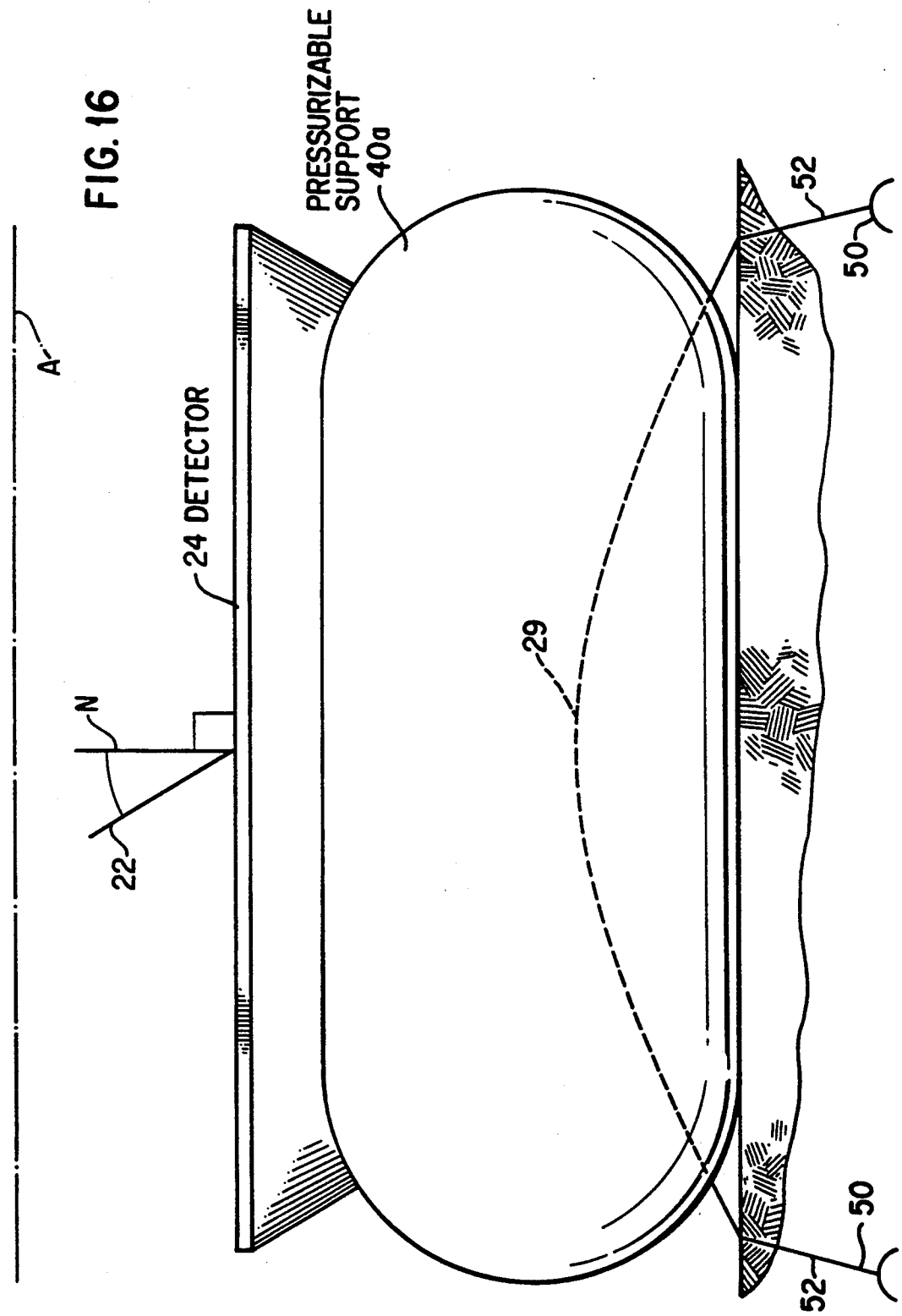

VARIABLY PRESSURABLE SUPPORT AND TRACKING APPARATUS AND METHOD FOR TRACKING MOVING RADIATION SOURCE

BACKGROUND OF THE INVENTION

1. Field of the Invention

The present invention relates generally to variably pressurizable support means for supporting and orienting a radiation detector means on a moving radiation source, and a method for tracking and orienting a radiation detector means using variably pressurizable support means.

2. Description of Related Art

Numerous conventional systems are known for orienting a radiation detector apparatus on a moving radiation source, and tracking the source as it moves.

In general, such systems can be divided into two groups. The first uses purely mechanical devices to support the radiation detector means and track the radiation source. The second group is a hybrid between purely mechanical devices, which provide one of the support or tracking functions and nonmechanical systems such as thermal or pneumatic devices, which provide the other of the tracking or support functions.

A common problem for all moving radiation source tracking devices is control of the angle of incidence of the radiation source on the radiation detector. It is well known that the degree to which the detectors receive radiation effects the efficiency of the detectors' radiation-related functions. Minimizing the angle of incidence is critical to maximizing the efficiency of the radiation detector.

The angle of incidence between the radiation source and the radiation detector is the angle between a line normal to the surface of the radiation detector and any single ray of radiation emitted from the radiation source which strikes the radiation detector. In an apparatus, for both supporting a radiation detector and tracking a moving radiation source, which has a single degree of freedom, the angle of incidence is limited to that component of the angle of incidence which lies in the plane perpendicular to the surface of the radiation detector and is parallel to the path of the radiation source across the radiation detector.

In order to minimize the angle of incidence, it is necessary to continually reorient the radiation detector as the radiation source moves. In purely mechanical systems, in which both the support of the radiation detector and the tracking of the radiation source is provided by mechanical devices, heavy duty gearing systems and motors are required to move the radiation detector and its heavy structural system. A heavy structural system is needed to insulate the radiation detector means from the effects of wind, snow and other weather-related loads and earthquake and other geologic loads.

For example, in the hybrid system of U.S. Pat. No. 4,283,588, the support for the radiation detector is provided by a mechanical apparatus, while tracking is provided by thermal devices which are able to change the orientation of the radiation detectors depending upon the amount of radiant energy the thermal devices receive. While this device removes the requirement for the mechanical tracking means, and saves the costs for maintenance and repair, it does not diminish the requirement for a heavy structural support system. Conversely, for example, U.S. Pat. No. 4,762,298 replaces the mechanical support structure with a variably pressurable support device, but a mechanical tracking apparatus is still used, with the resulting high maintenance and repair costs.

SUMMARY OF THE INVENTION

In contrast to both of the above-conventional hybrid systems, the present invention is drawn towards a system for providing both the support function and the tracking function by purely pneumatic means. It is therefore an objective of the present invention to provide a novel low-cost, rapidly installable and low-maintenance support and tracking apparatus that overcomes the disadvantages and shortcomings of the prior art hybrid systems.

It is another general objective of the present invention to provide a novel support means for a radiation detector which does not require a mechanical support structure and therefore allows for rapid installation of the support and tracking apparatus.

It is a further general objective of the present invention to provide a novel method and apparatus for tracking a moving radiation source.

To achieve the foregoing and other objectives in accordance with the purpose of the present invention, as embodied and broadly described herein, the radiation source tracking apparatus includes at least one radiation detector, at least one controllable and variably pressurable radiation detector support for each radiation detector, anchoring means to secure the detector supports to the ground, and controllable pressurizing means able to variably pressurize the support means to orient the radiation detector on the radiation source at a minimal angle of incidence. The radiation tracking apparatus also includes a control apparatus for controlling at least the pressurizing means to properly orient the radiation detector on the radiation source at a minimal angle of incidence.

Additional objectives, advantages and novel features of the present invention shall be set forth in a description that follows, and will become apparent to those skilled in the art upon examination of the following. The objectives and advantages of the invention may be realized and attained by the means and combinations particularly pointed out in the appended claims.

BRIEF DESCRIPTION OF THE DRAWINGS

The preferred embodiments are described with a reference to the drawings, in which:

FIG. 3 is a side sectional view of a second embodiment of the present invention;

FIG. 4 is a side sectional view of a third embodiment of the invention illustrating a support means and anchoring means of the present invention;

FIGS. 5a, 5b, and 5c are side sectional views of a fourth embodiment of the present invention illustrating other supporting means and anchoring means;

FIGS. 7a is a side sectional view of a sixth embodiment of the present invention;

FIG. 15 is a side view of a fixed position pressurizable support means;

FIG. 16 is a rear view of the fixed position pressurizable support means; and

DETAILED DESCRIPTION OF THE PREFERRED EMBODIMENTS

Figure 1:
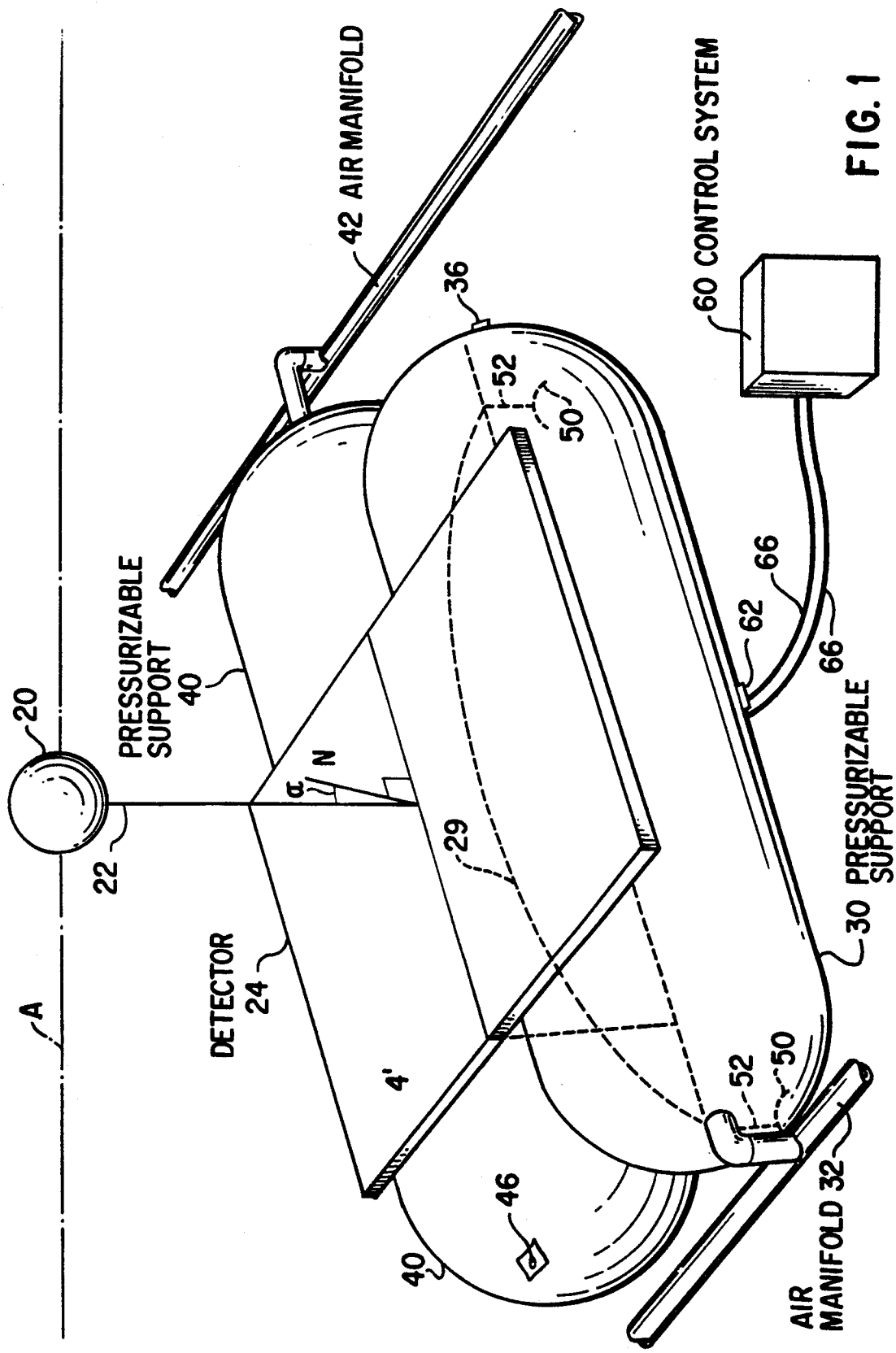
FIG. 1 is a perspective view of the radiation tracking device incorporating one embodiment of the present invention.

The preferred embodiment is directed to a variably pressurizable inflatable support system for a radiation detector means. Referring now to the drawings, and particularly FIG. 1, a radiation source 20, such as the sun, emits electro-magnetic radiation rays 22 onto a radiation detector means 24. The radiation detector means 24 is preferably a solar receiver such as a photovoltaic device or solar thermal device, but may be any solar energy collector or reflector. The radiation source 20 follows the path A about the radiation detector means 24, defining the path A'0 across the radiation detector means. The emitted radiation ray 22 from the radiation source 20 forms an angle of incidence o with a line N normal to a surface plane of the radiation detector and in path A'.

To maximize the efficiency of the radiation detector means 24, it is desirable to minimize the angle of incidence α, by tracking or following the radiation source 20 as it moves along path A. Radiation detector means 24 is therefore supported by a variably pressurable inflatable support system.

Figure 2:
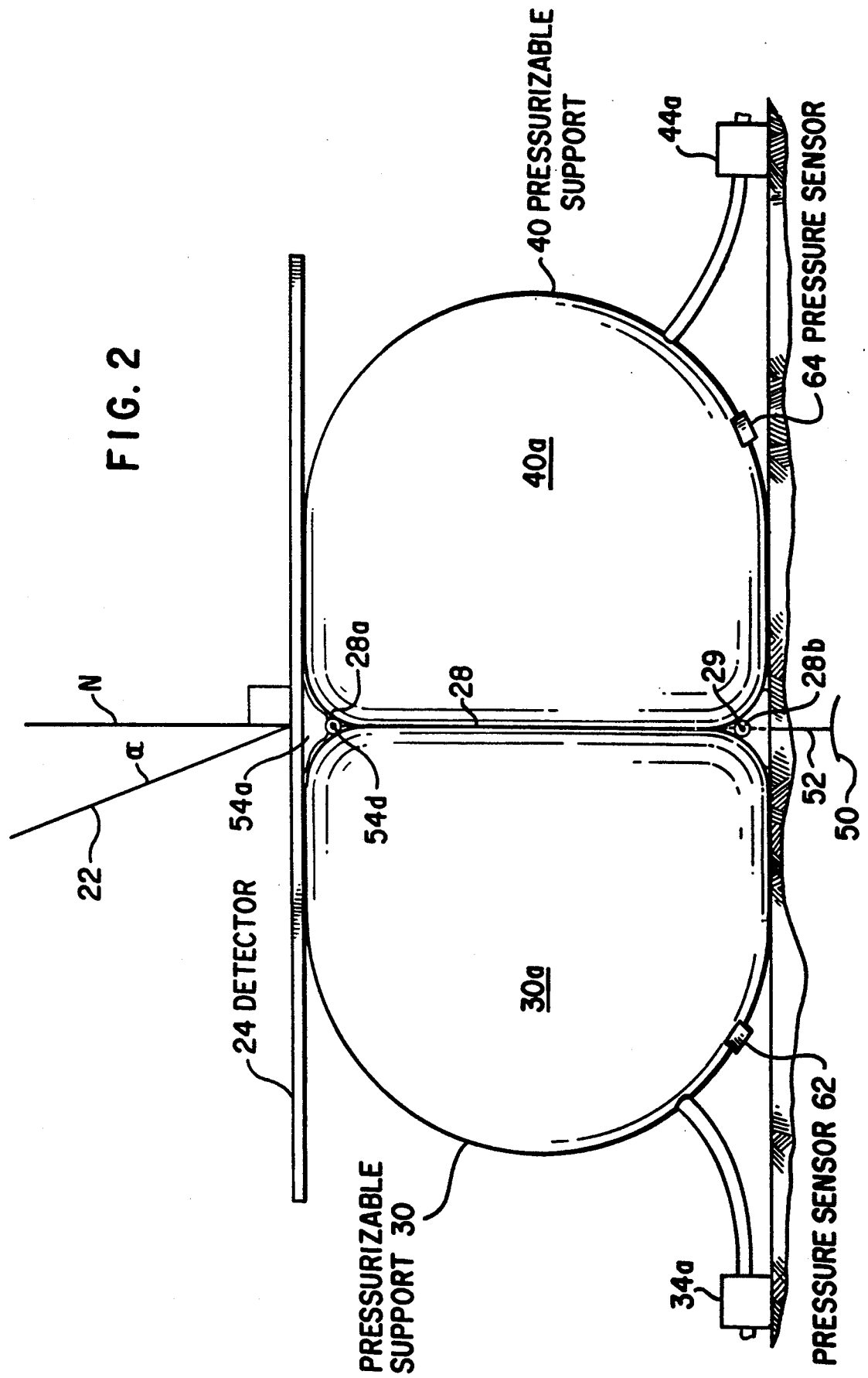
FIG. 2 is a side sectional view of the device in FIG. 1 but illustrating another embodiment of the pressuring means.
Figure 8A:
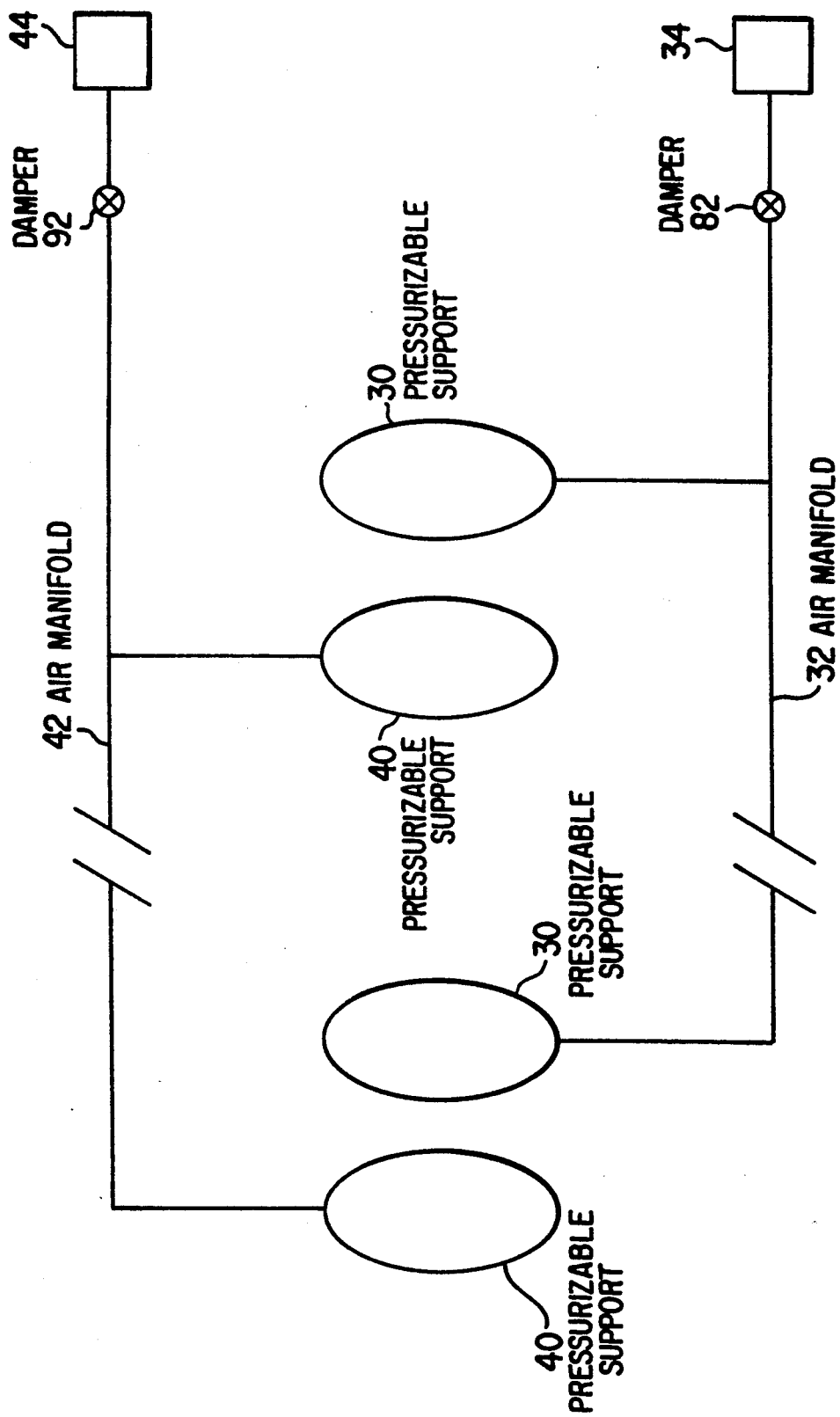
FIG. 8a is a schematic view of a first embodiment of the pressurizing means of the present invention.

Referring now to FIGS. 1-2, the radiation source tracking apparatus comprises at least one radiation detector means 24, and preferably a plurality of detector means 24 arranged in at least a one dimensional array, as shown schematically in FIG. 8a. The tracking apparatus also comprises a pressurizable support system 26. The support system 26 preferably has at least two resiliently flexible pressurizable support means 30 and 40 supporting the radiation detector 24. The membranes 30 and 40 are preferably formed from a polymeric material, such as polyvinyl-chloride-coated polyester woven fabric or coated glassfiber fabric. The support means 30 and 40 each comprise a non-porous pressurizable membrane or enclosure and define unitary, virtually airtight pressurizable chambers 30a and 40a, respectively. Preferably, the support means 30 and 40 are inflated to an internal operating pressure of less than approximately 0.5 psi.

Figure 14:
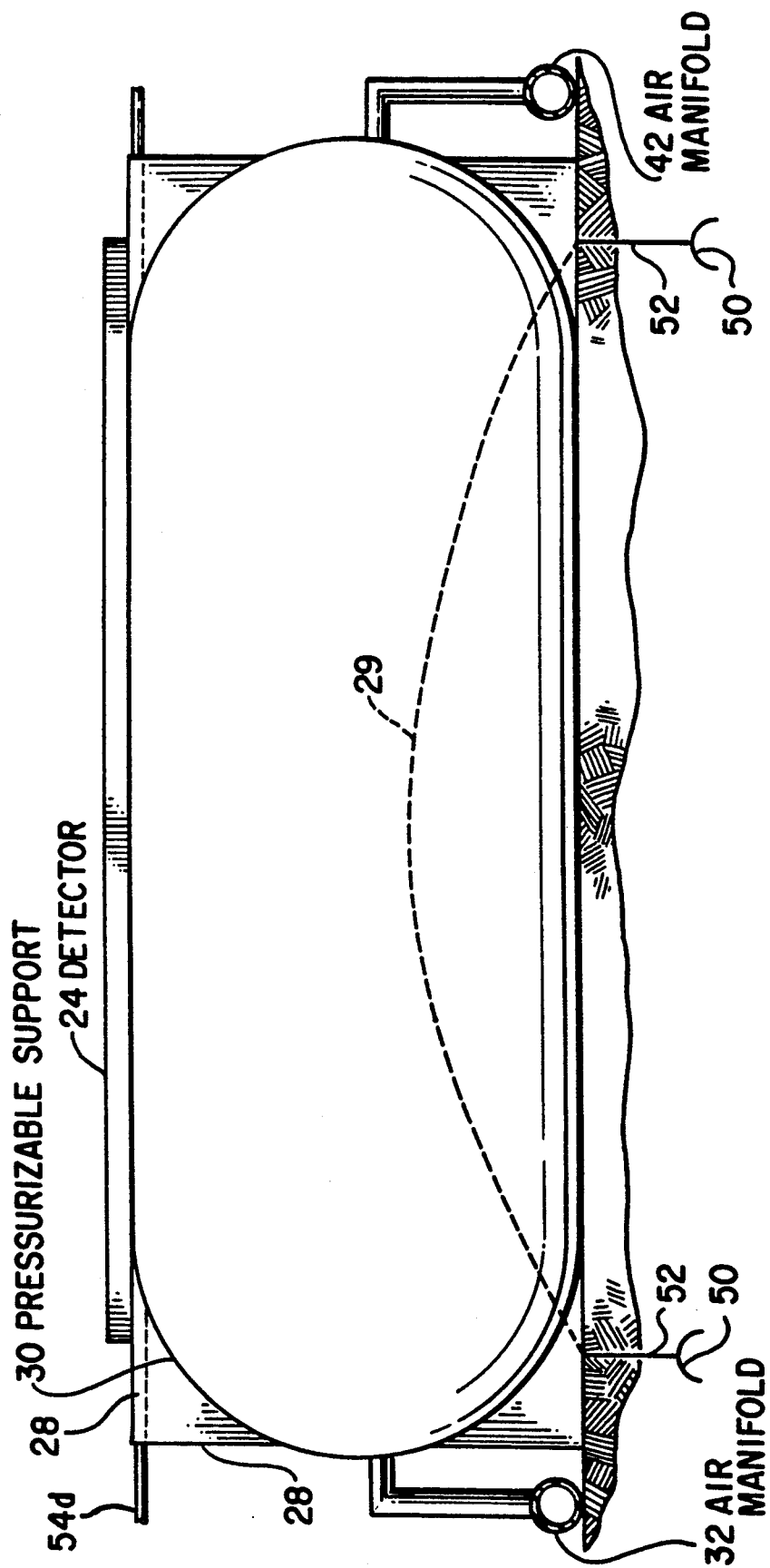
FIG. 14 is a longitudinal view of the embodiment of FIG. 1.

As shown in FIG. 2, in the preferred embodiment tension wall 28 is placed between membranes 30 and 40. A sleeved section 28a is formed at a top end of tension wall 28, and hinge pin 54d is inserted into it. The hinge pin 54d is preferably a length of conduit or other rigid cylindrical member or cable. Hinge 54a is inserted into cut out section of sleeve 28a to secure the radiation detector means to the tension wall. Sleeve section 28b is formed at the bottom part of tension wall 28, and a cable 29 is inserted such that it forms an inverted catenary, as shown in FIG. 14. Anchor cables 52 are attached to the cable 29 to secure the tension wall 28 to the ground. The membranes 30 and 40 are also attached to the tension wall 28.

In a first preferred embodiment of the support means, as shown in FIG. 1, the support means 30 and 40 are pressurizable cylindrically-shaped membranes. The membranes 30 and 40 are arranged so that the radiation detector means 24 lies parallel to their longitudinal axes B, and is supported in the radial direction C of the membranes. In a second embodiment shown in FIG. 3, the cylindrical membranes 30 and 40 are arranged so that the radiation detector means 24 lies parallel to their radial direction C and is supported in the longitudinal direction B.

It is necessary for the membrane of the present invention be sufficiently strong enough in order to support the load from the radiation detector means. In addition, the membrane must be sufficiently strong enough to withstand wind and snow loads acting not only on the membrane itself, but also those acting on the radiation detector means. Because of the geometry of both the radiation detector means itself and the membrane-detector combination, the loads acting on the radiation detector means can be significantly higher than the loads acting directly on the membrane.

In the embodiments of FIGS. 1-3, the anchor means 50 are preferably any one of auger earth anchors, spikes, buried plates, or solid footings, or the like to which the cables 52 can be attached. Preferably, the anchors are placed along the longitudinal axis of the membrane, and connected to the membranes by means of the cables 29 and 52.

Alternatively, anchor means 50 can be connected to the membranes 30 and 40 by cables 52 and cable bosses 53, to secure the inflatable membranes 30 and 40 directly to the ground. The cable bosses 53 are integrally formed with the support means 30 and 40. A hinge 54 comprises hinge sections 54a-54c and hinge pin 54d, as shown in FIG. 4, and pivotably attaches the radiation detector means to the support means 30 and 40. The hinge sections 54a are fixedly attached to the radiation detector means, while the hinge sections 54b and 54c are integrally formed with the support means 30 and 40, respectively. The hinge sections 54a-54c are linked together with by the hinge pin 54d. When linked together, the hinge section 54a-54c define a door-hinge-like connection between the support means 30 and 40 and radiation detector means 24.

Figure 5A:
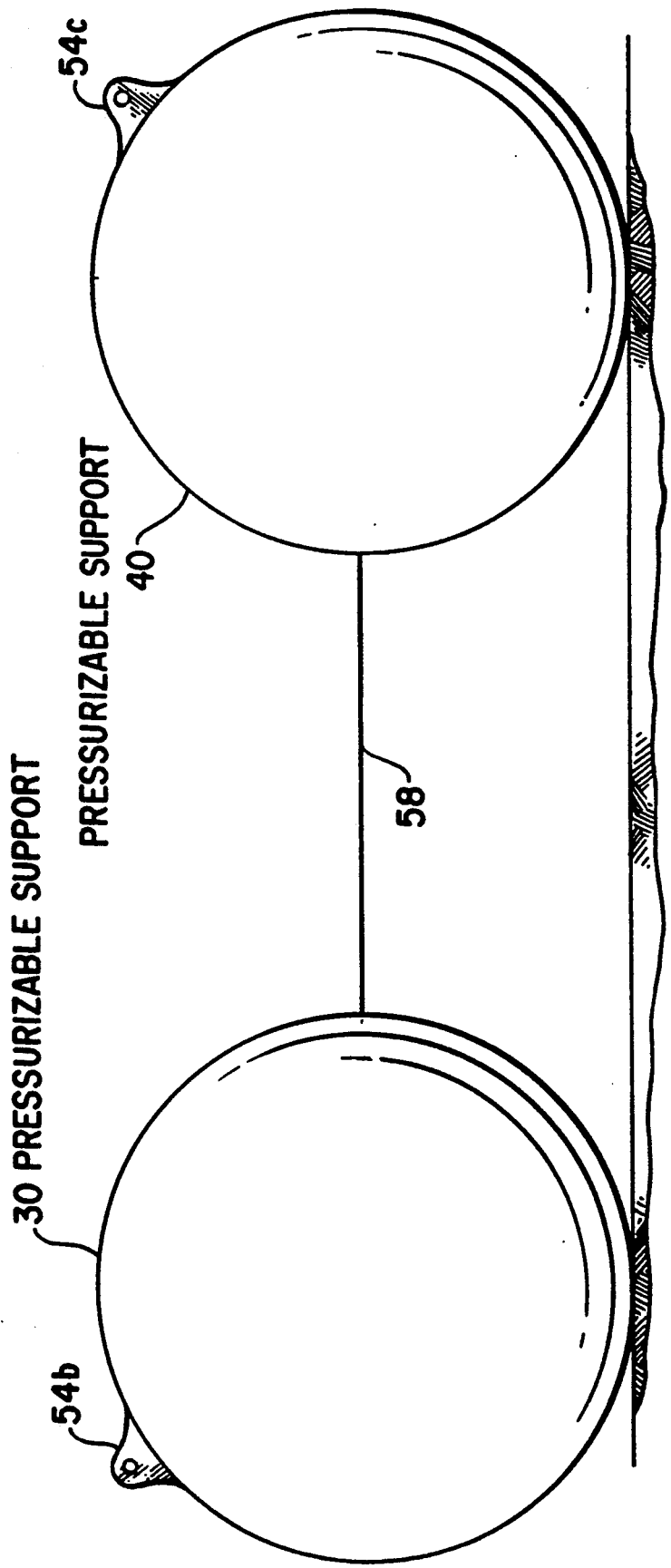
Figure 5C:
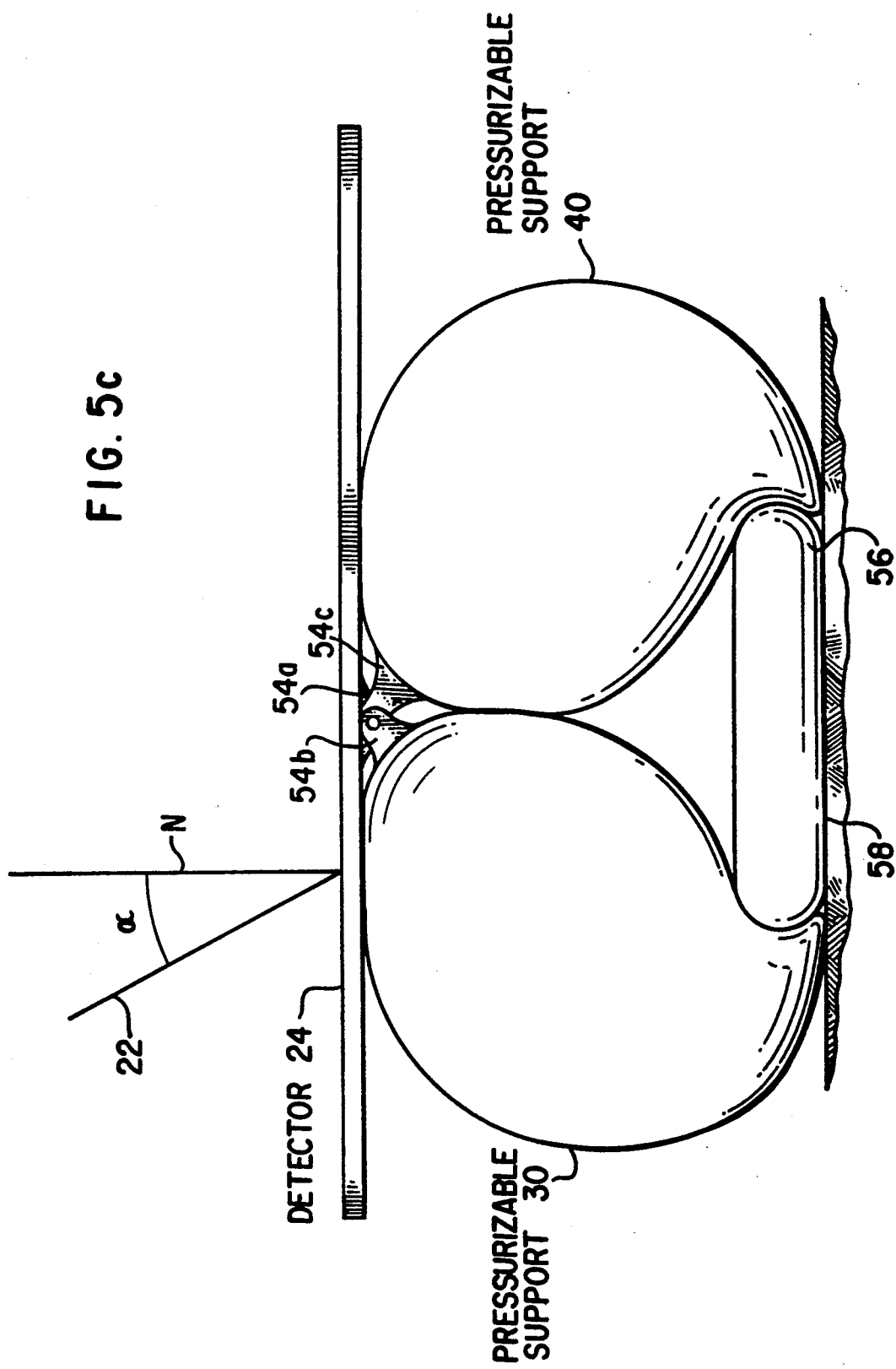

In a third embodiment of the inflatable membranes, as shown in FIG. 4, a weight 56 such as cast-in-place, unreinforced concrete, sand, water or the like is inserted into the interior of the membranes 30 and 40 through resealable openings 38 and 48, respectively. In a fourth embodiment of the inflatable membranes, as shown in FIGS. 5a-5c, the membranes 30 and 40 are linked by sheet 58, and the weight 56 is deposited on top of sheet 58, drawing the membranes 30 and 40 together. The weight 56 conforms to the shape of the pressurized membrane acting against the weight, and therefore requires no additional framework or support.

Figure 6:
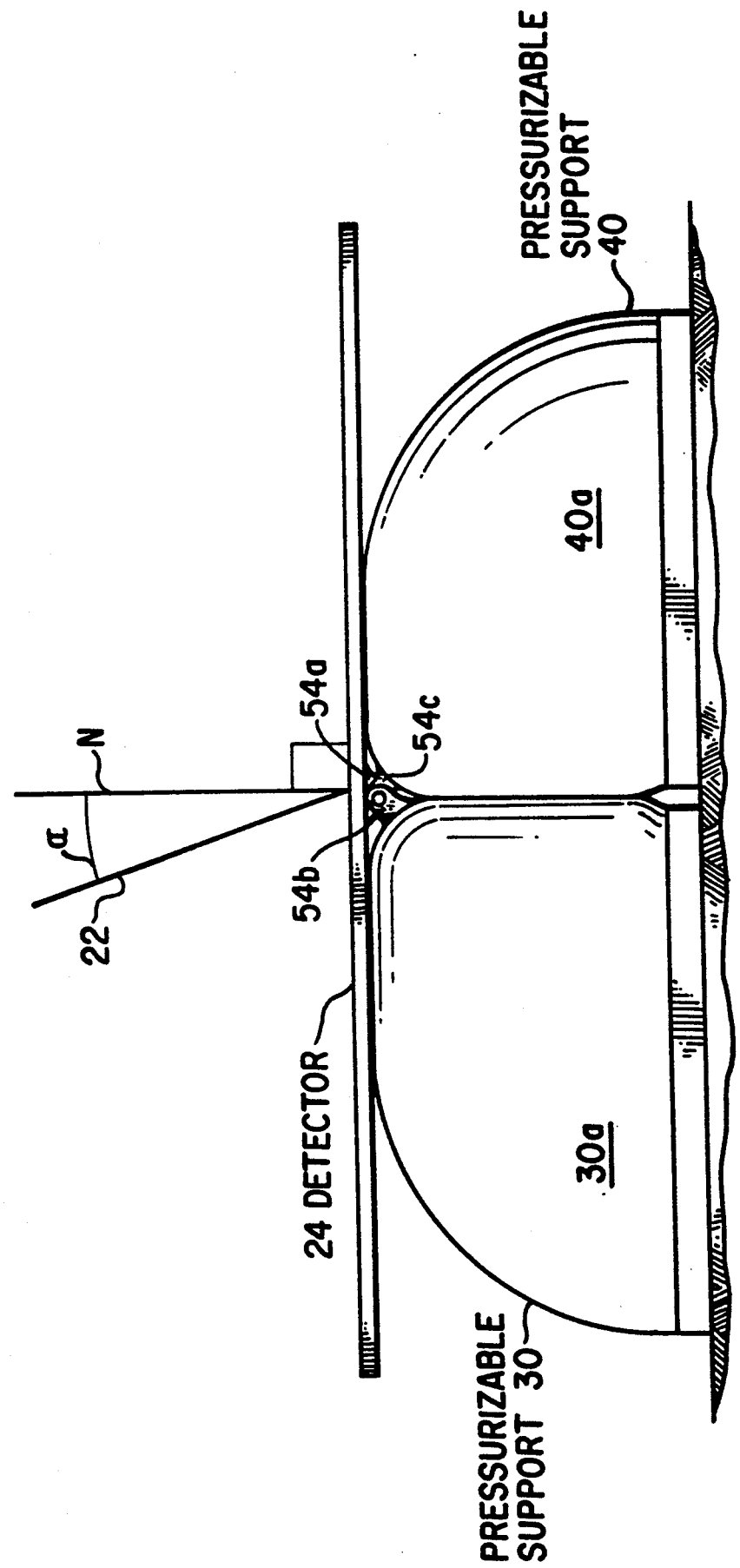
FIG. 6 is a side sectional view of a fifth embodiment of the present invention.

In a fifth embodiment of the support means, as shown in FIG. 6, membranes 130 and 140 are open membranes formed in a semi-cylindrical shape. Anchor 150 is a solid rectangular footing of concrete or the like, to which the edges of the membranes 130 and 140 are sealably attached.

Figure 7B:
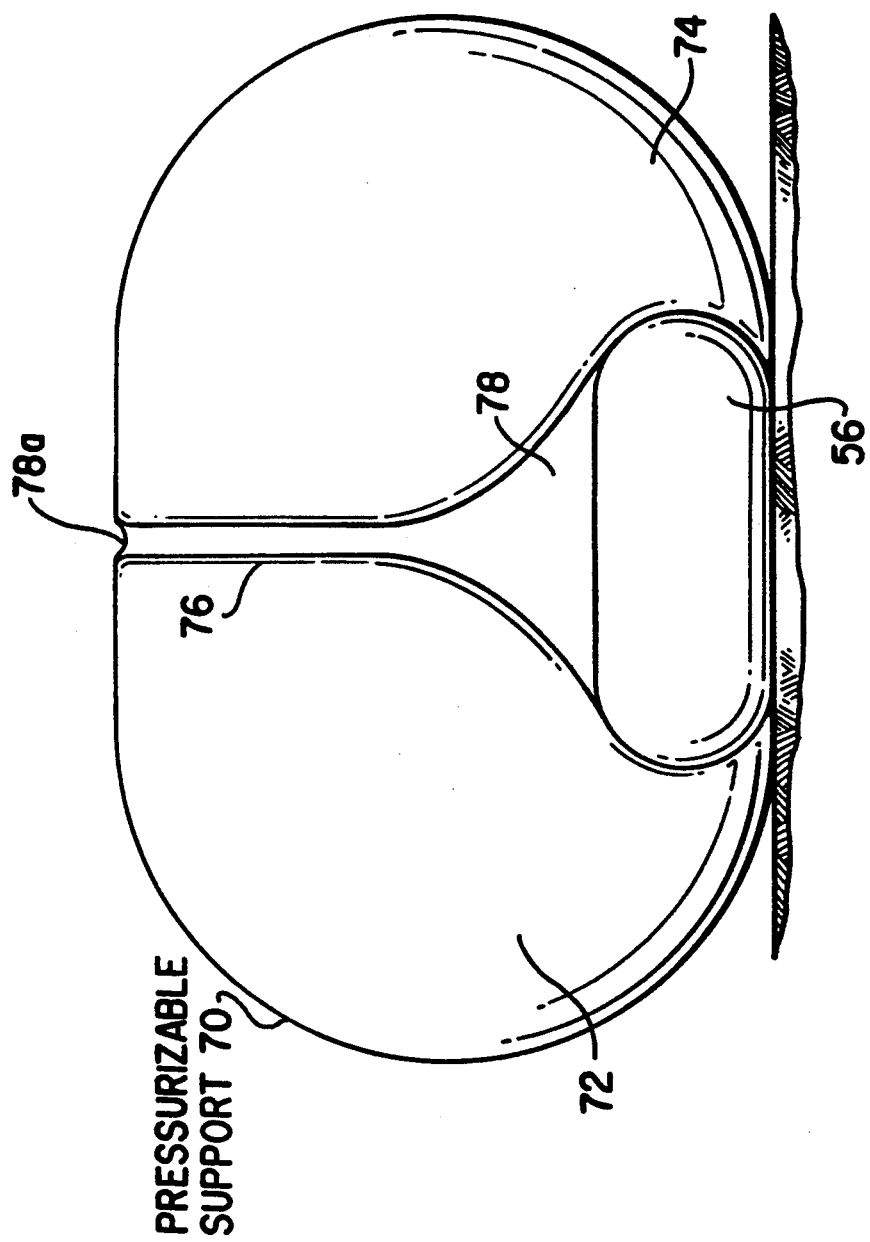
FIG. 7b is a side sectional view of the sixth embodiment of the invention employing the anchoring means of FIG. 4.

In a sixth embodiment of the support means, as shown in FIGS. 7a and 7b, a single cylindrical membrane 70 having two independently inflatable chambers 72 and 74 defined within it by a sheet membrane 76 replaces the two single-chamber inflatable membranes 30 and 40. In FIG. 7b, the sheet membrane 76 is modified to form a pocket 78 in the membrane 70 which opens through an opening 78a to the outer surface of membrane 70. The weight 56 can then be inserted through opening 78a into pocket 78 to anchor the membrane 70 to the ground.

In a first preferred embodiment of the pressurizing means 28, as shown in FIGS. 1 and 8a, each of the membranes 30 is connected to an air manifold 32, and each of the membranes 40 is connected to an air manifold 42.

The air supply manifolds 32 and 42 connect the pressurizable support means 30 and 40 to pressurizing means 34 and 44. The pressurizing means 34 and 44 are preferably low pressure fans or air-blowers able to variably pressurize the support means up to approximately 0.5 psi above ambient pressure. The pressurizing means 34 and 44 are preferably reversible in order to both raise or lower the internal pressure of the support means. Deflating means 36 and 46 are sealably inserted into the support means 30 and 40 to prevent overpressuring and rupture of the membranes. Preferably, the deflating means are pressure relief valves. Pressure sensor means 62 and 64 are sealably inserted into support means 30 and 40, respectively, and connected by a pair of conductors 66 to the control apparatus 60. Preferably, the pressure sensor means are piezoelectric sensors, diaphragm pressure transducers or the like.

As shown in FIG. 8a, common damping means 82 is inserted in air supply manifold 32 between the pressurizing means 34 and the membranes 30. Likewise, common damping means 92 is inserted in air manifold 42 between pressurizing means 44 and membranes 40. In operation, the damping means such as common damping means 82 and 92 are rotatable between a first or open position and a second or closed position. The open position of common damping means 82 and 92 allows the flow of air between the pressurizing means 34 and 44 and the membranes 30 and 40. In the open position, the reversible pressurizing means 34 and 44 can simultaneously raise or lower the pressure in all of the commonly connected membranes 30 and 40, respectively. In the closed position, damping means 82 and 92 provide a substantially air-tight seal between the commonly connected membranes 30 and 40, respectively and the blowers 34 and 44 and atmosphere. Additionally, the pressure in the commonly connected membranes 30 or 40 is equalized, preventing any single membrane from becoming substantially over or underinflated.

As shown in FIG. 2, a second preferred embodiment of the pressurizing means has pressurizing means 34a and 44a connected directly to each membrane 30 and 40 respectively. While this allows for more precise control of the internal pressure of each membrane, and therefore better control of the angle of incidence on each radiation detector means, greater sophistication of the control apparatus is required to separately control each membrane. FIG. 8d shows a hybrid embodiment, wherein pressuring means 34a and 44a supplement, instead of replace, manifolds 32 and 42 and pressurizing means 34 and 44. This embodiment allows the gross control of the plurality of the support means to be controlled by the pressurizing means 34 and 44, while the individual fine control of each membrane 30 or 40 is accomplished by pressurizing means 34a or 44a. This embodiment, however, also requires that additional damping means 85, 87, 95 and 97 be inserted between the membranes and supply manifold 32, pressurizing means 34a, supply manifold 42 and pressurizing means 44a, respectively, to properly isolate the individual membranes.

Figure 8B:
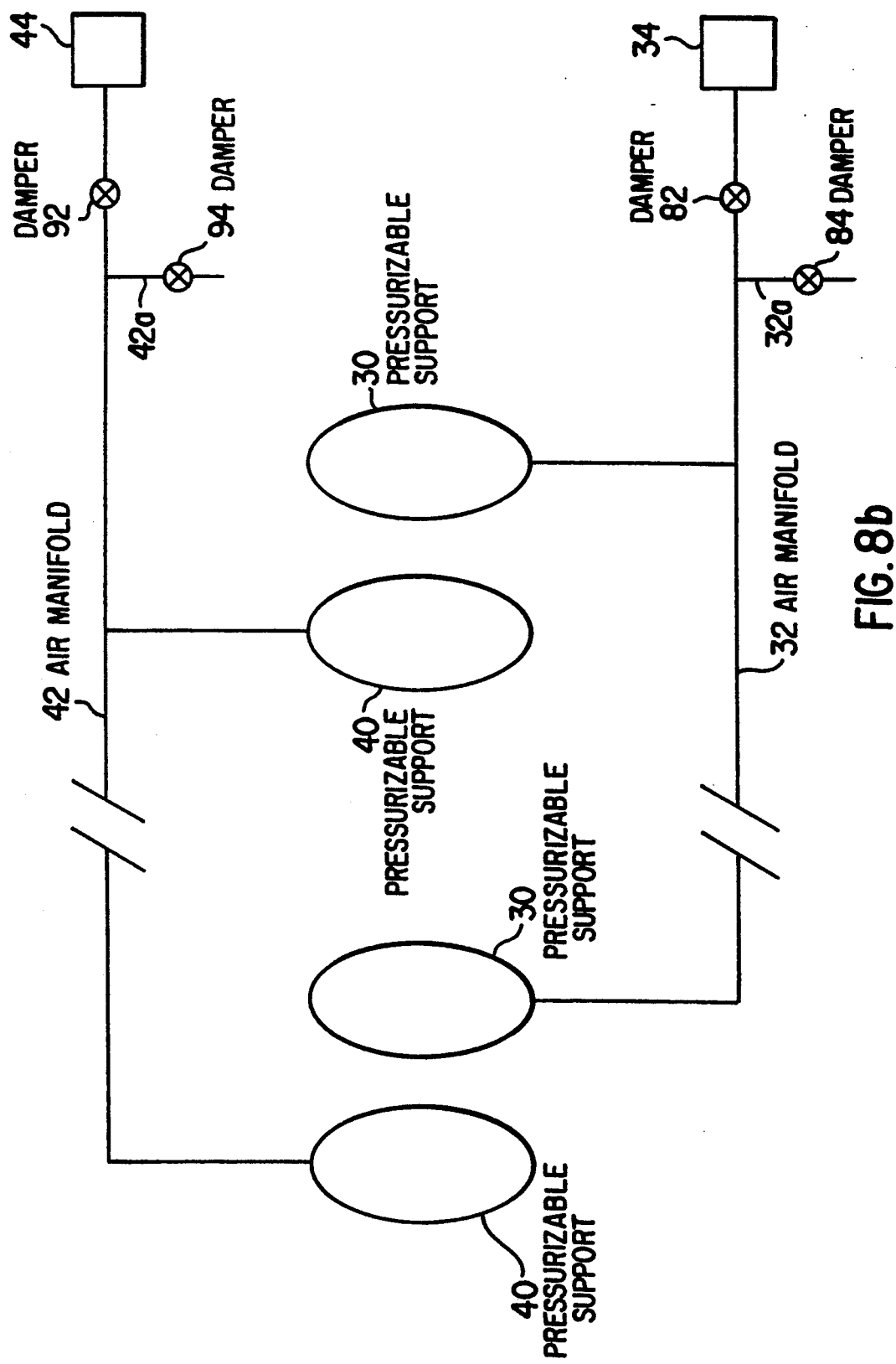
FIG. 8b is a schematic view of a second embodiment of the pressurizing means of the present invention.

In a third embodiment of the pressurizing means shown in FIG. 8b, second common damping means 84 and 94 have been inserted in air supply manifolds 32 and 42, respectively between the first common damping means 82 and 92 and the membranes 30 and 40. The second common damping means connect the air supply manifolds directly to the atmosphere, through shunts 32a and 42a allowing the pressure in the membranes to be reduced by venting directly to the atmosphere rather than through the first common damping means and the pressurizing means. In this embodiment, the pressurizing means 34 and 44 need not be reversible, thereby providing a reduction in cost.

Figure 8C:
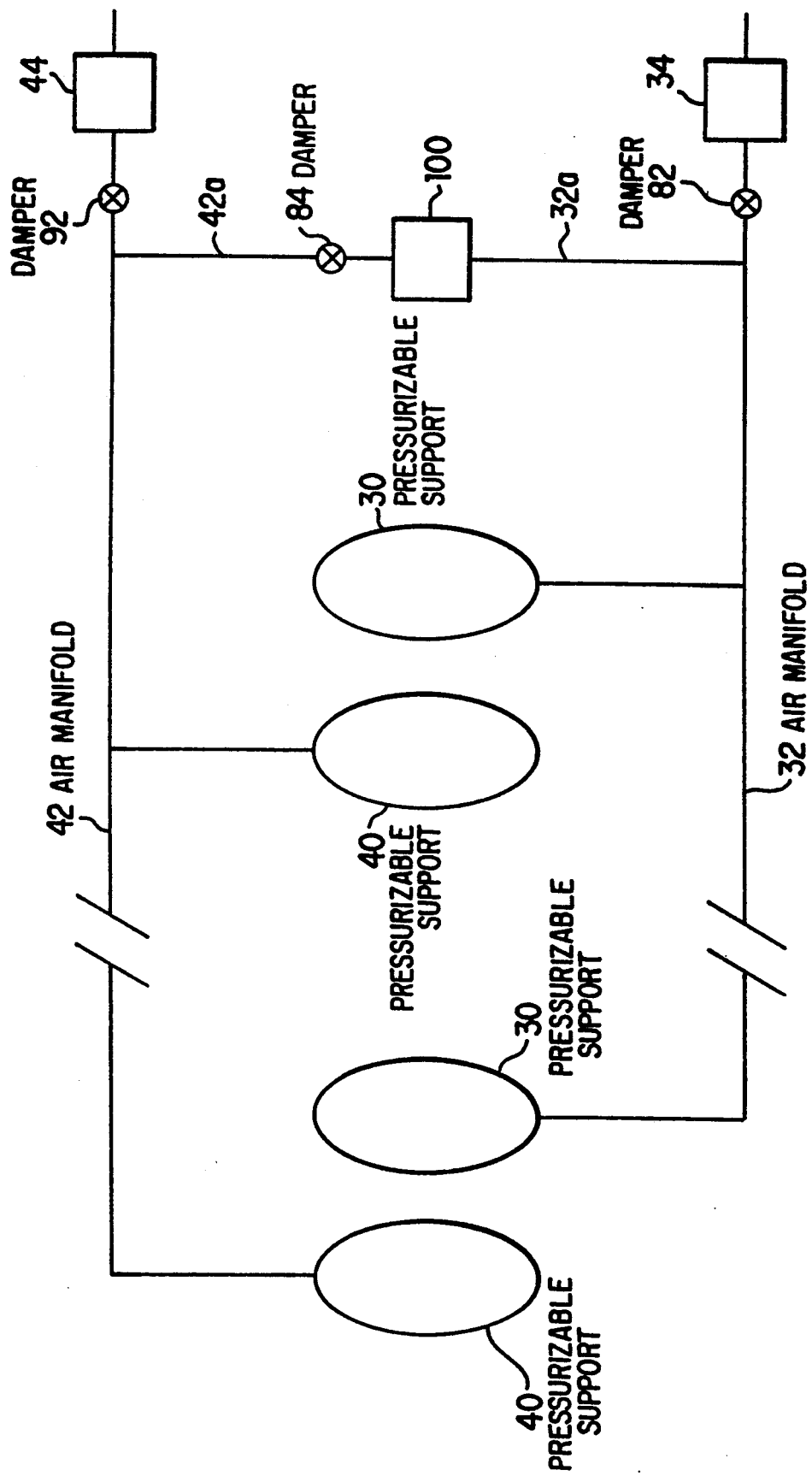
FIG. 8c is a schematic view of a third embodiment of the pressurizing means of the present invention.
Figure 8D:
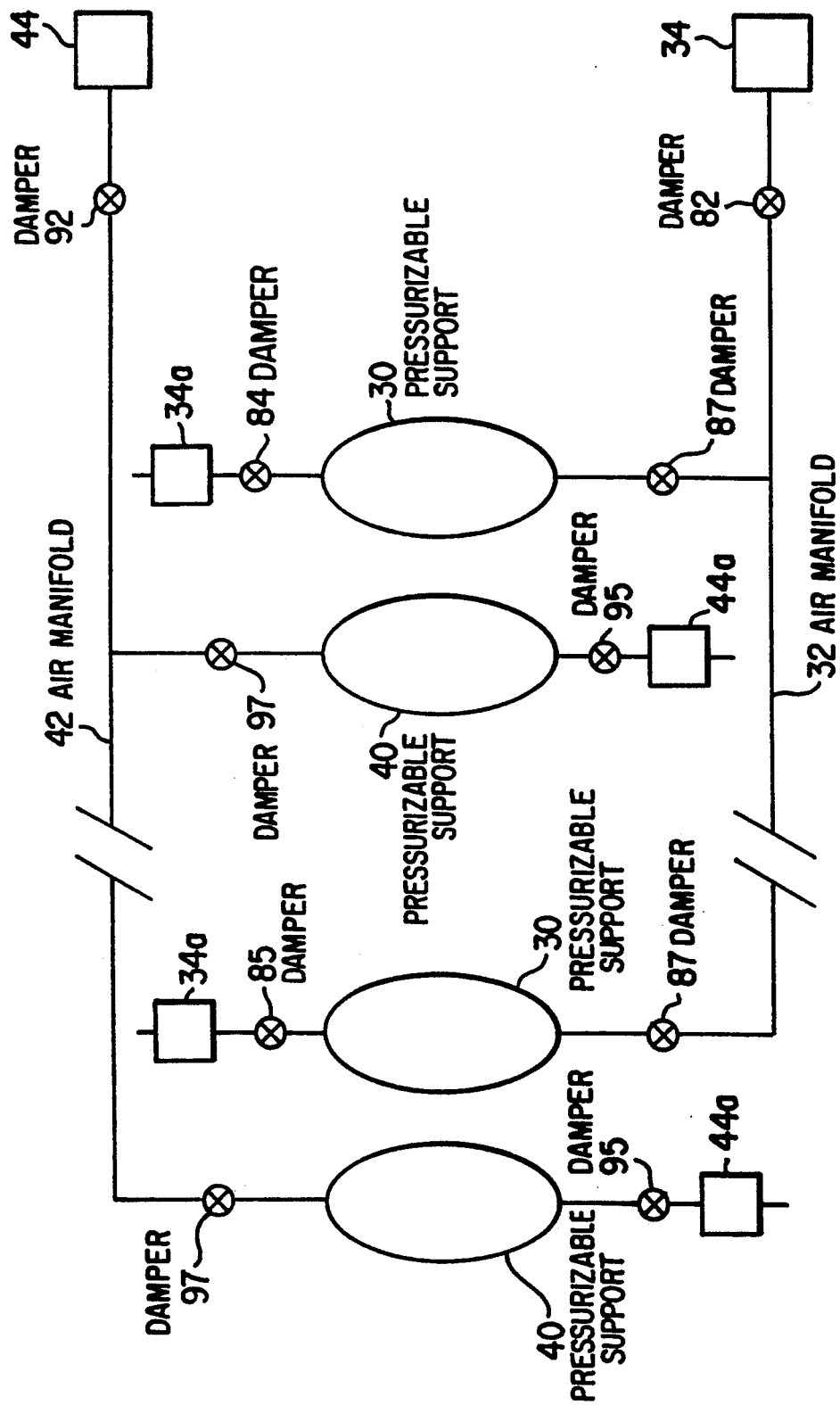
FIG. 8d is a schematic view of a fourth embodiment of the pressurizing means of the present invention.

In a fourth embodiment of the pressurizing means shown in FIG. 8c, one of the second common damping means such as damping means 94 has been replaced by a second common pressurizing means 100. In addition, the shunts 32a and 42a have been connected to either side of the second common pressurizing means 100. In this embodiment, pressurizing means 34 and 44 are non-reversible, and supply outside air to the support system. In operation, when the pressure of one of membranes 30 or 40 is to be lowered while the pressure of the other one of membranes 30 or 40 is to be raised, damping means 84 is opened and the second common pressurizing means 100 is run in a forward or reverse direction depending on whether the air is to be moved from membranes 30 to 40 or vise versa. In this arrangement, the introduction of outside air and any contaminants contained in it are minimized. When the system is initially pressurized, both the pressurizing means 34 and 44 will be operated and the first common damping means 82 and 92 will be moved to the open position. Thereafter, when adjustments are required in the pressures of the respective support means, these changes will be accomplished through corresponding use of the second common pressurizing means 100 and second common damping means 84. When it becomes necessary to depressurize the entire system, first common damping means 82 and 92 can be opened while the pressurizing means 34 and 44 remain shut off.

Figure 9A:
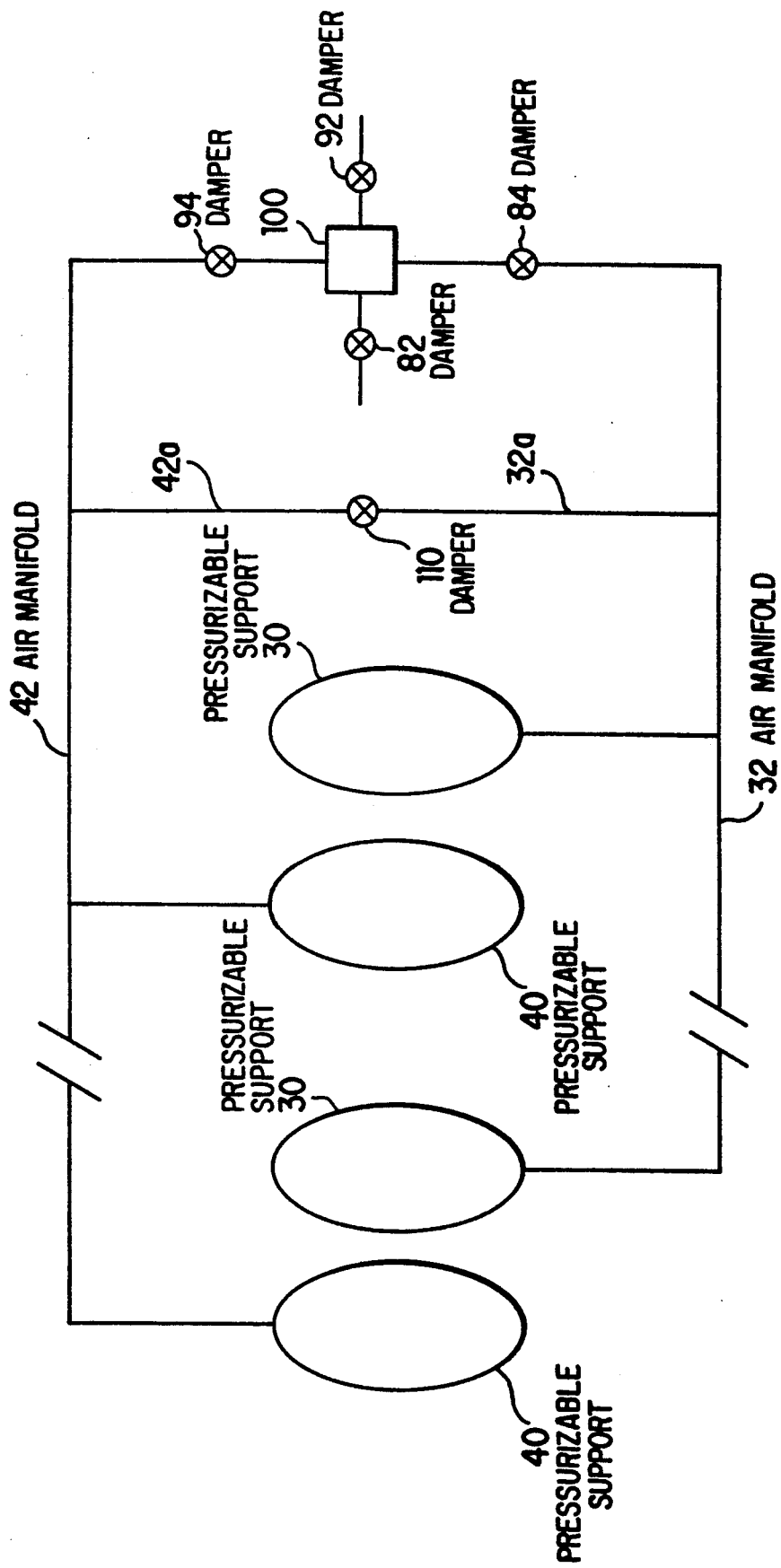
FIG. 9a is a schematic view of a fifth embodiment of the pressurizing means of the present invention.

In a fifth embodiment of the pressurizing means, shown in FIG. 9, the pressurizing means 34 and 44 are completely replaced by the second common pressurizing means 100. The pressurizing means 100 is moved from a position between first common damping means 82 and 92 and the membranes 30 and 40 to a position between damping means 82 and 92 and outside air. In addition, second common damping means 84 and 94 are also moved to a position upstream of the second common pressurizing means 100, as shown in FIG. 9a. In this position, the membranes 30 can be initially pressurized by opening damping means 84 and 92 while membranes 40 can be pressurized by opening damping means 82 and 94. In addition, when pressure in membranes 30 needs to be raised and the pressure in membranes 40 needs to be lowered, or vise versa, both damping means 82 and 92 can be opened and second common pressurizing means 100 can be operated in the corresponding direction. Finally, if the entire system needs to be deflated or depressurized, all of damping means 82, 92, 84, 94 can be opened and the pressurizing means shut off.

Figure 9B:
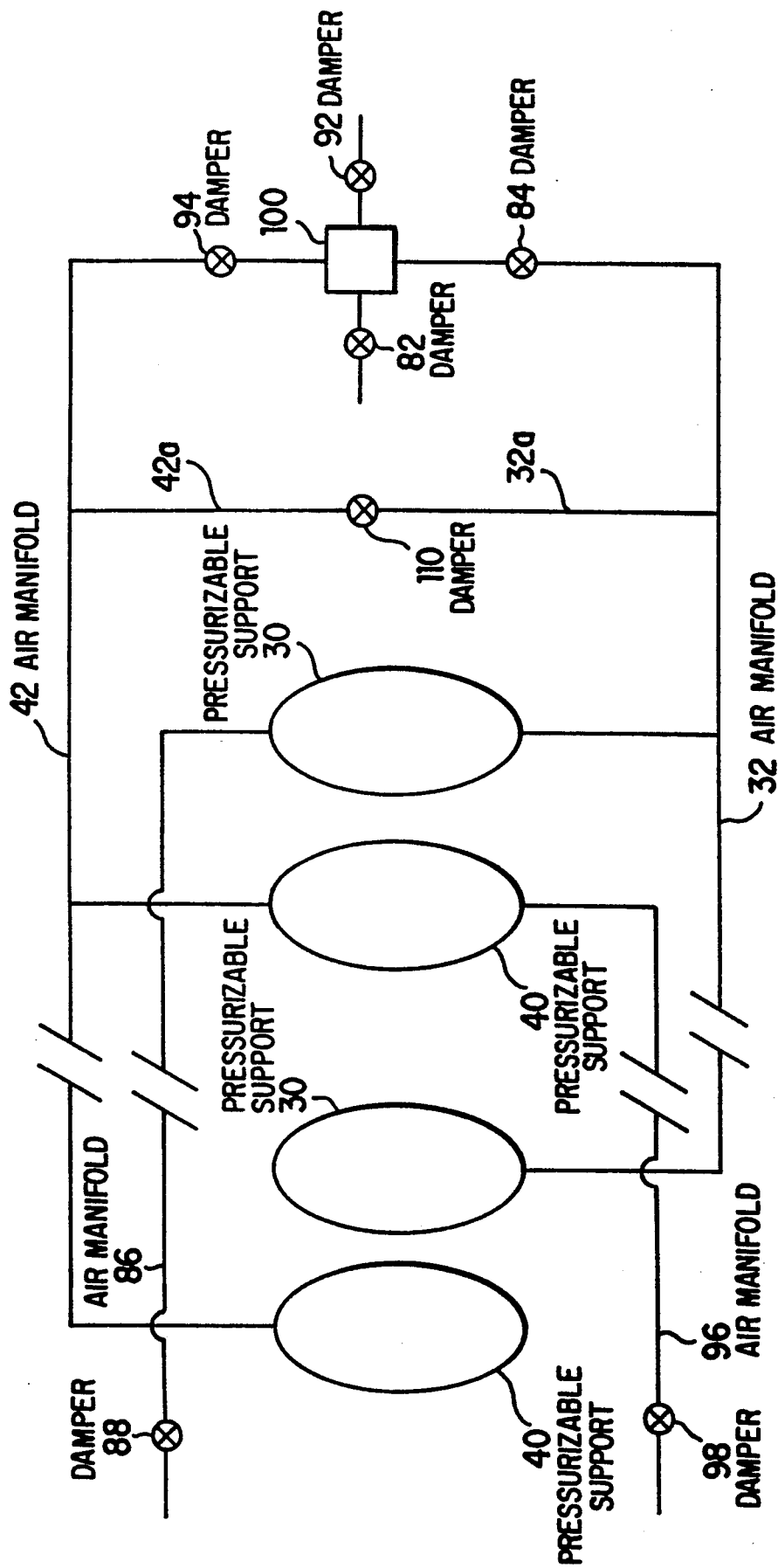
FIG. 9b is a schematic view of a sixth embodiment of the pressurizing means of the present invention.

In a sixth preferred embodiment, as shown in FIG. 9b, exhaust manifolds 86 and 96 are attached to membranes 30 and 40, respectively, and third common damping means 88 and 98 are attached to the exhaust manifolds, respectively. This exhaust system can be attached to any one of the embodiments shown in FIGS. 8 or 9. The exhaust system 102 provides for a relief from the phenomenon of radiant heating.

Because the inflatable membranes are intended to be located in places receiving large amounts of energy from the radiation source, it is possible that the radiation will also heat the support means, thereby raising the internal pressures. While pressure control can be accomplished through continuous control of the pressurizing and damping means, the exhaust system 102 provides a separate solution. Thermocouples 104 and 106 can be connected to the support means 30 and 40, respectively. When a temperature or pressure rise is noted in the support means, the exhaust manifolds 86 or 96 can be used by opening damping means 88 or 98 to provide a means for exhausting heated air from the support means, while one of first common damping means 82 and 92 and an alternate one of the second damping means 94 or 84 can also be opened and the second common pressurizing means 100 operates in the proper direction to provide fresh cool air to the membranes. Additionally, shunts 32a and 42a and fourth common damping means 110 can be used to supply cool outside air to both sets of support means simultaneously. By continually flushing the cool outside air through the support means, the orientation of the radiation detector means 24 can be better controlled, and heat-induced deterioration of the support means can be avoided.

Figure 10:
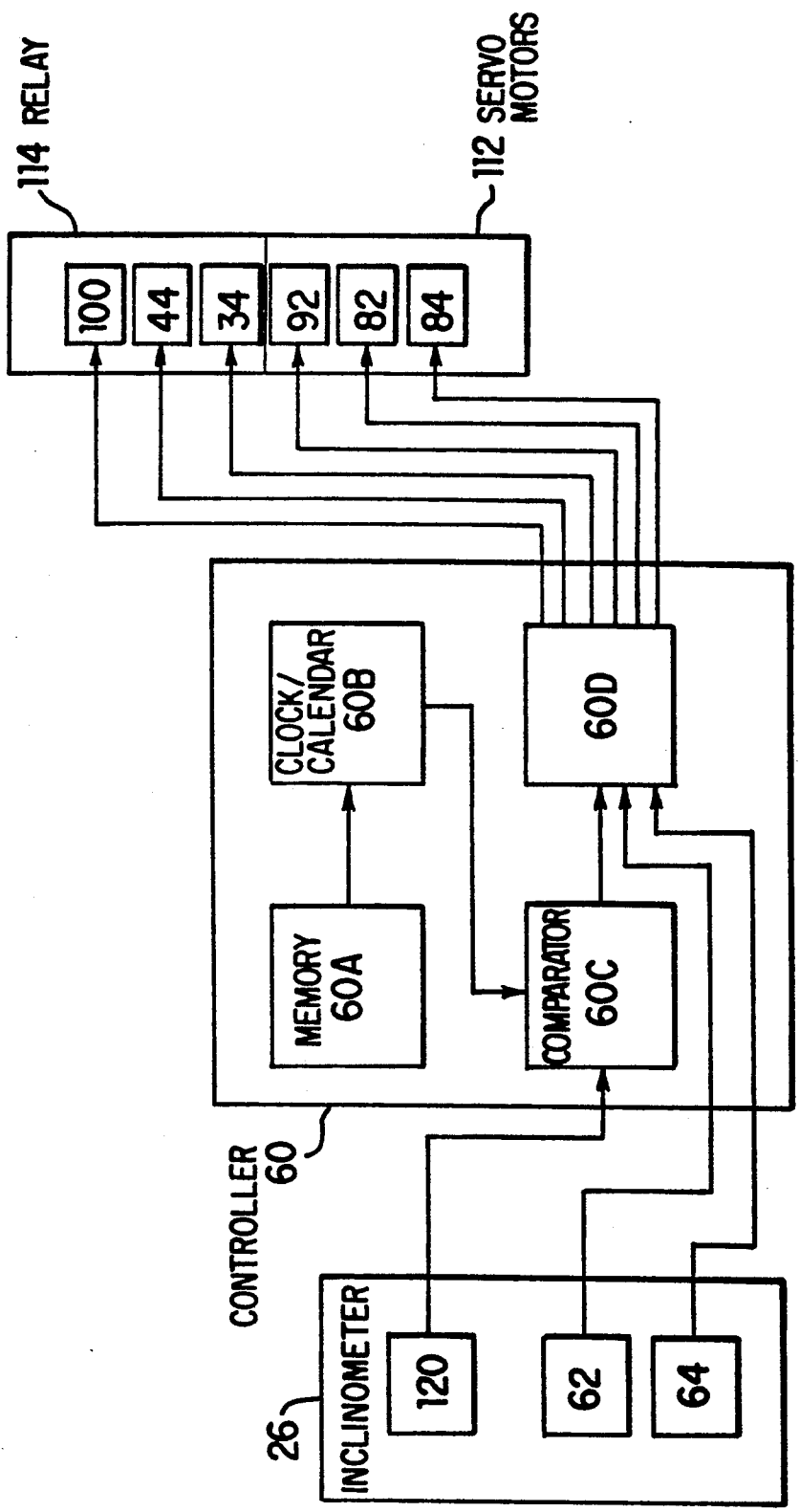
FIG. 10 is a schematic view of the first embodiment of the control means implementing the third embodiment of the pressurizing means.

In all of the embodiments shown in FIGS. 8, 9 and 10, the damping means are opened and closed by electromechanical servo motors or the like 112, connected by conductors 66 to the control means 60. Likewise, conductors 66 connect relays 114 for turning on and off the pressurizing means 34, 44 and 100 to the control means 60.

Figure 11A:
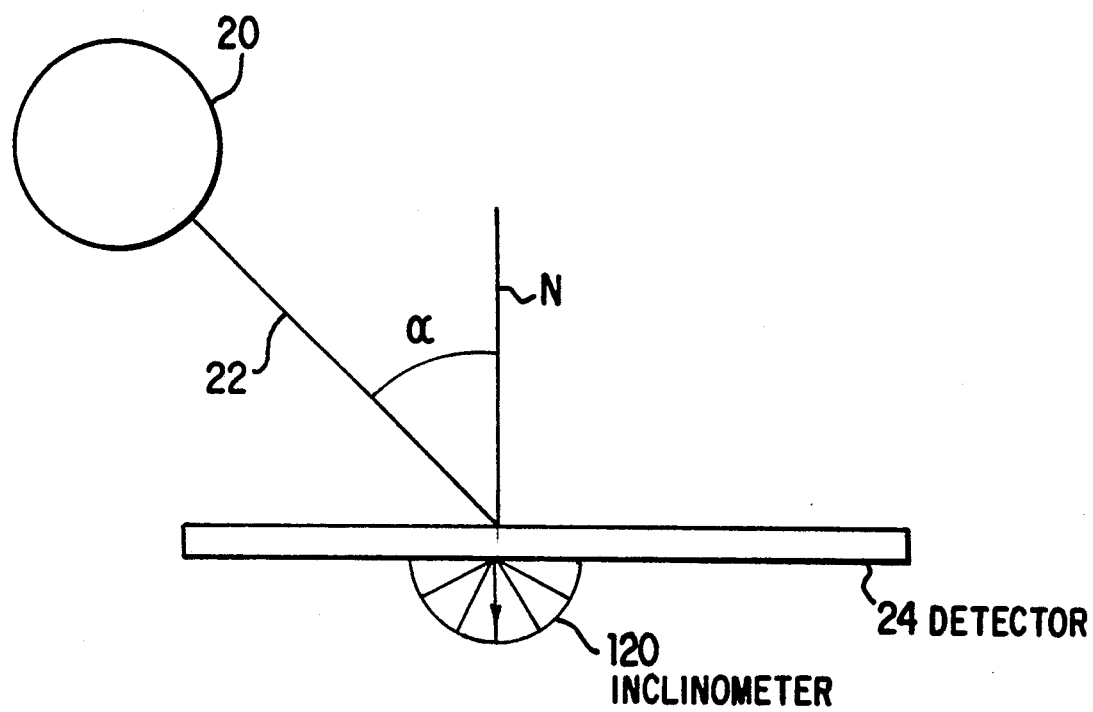
FIGS. 11a and 11b are schematic views of a first embodiment of the control means using an inclinometer showing two different angles of incidence.
Figure 11B:
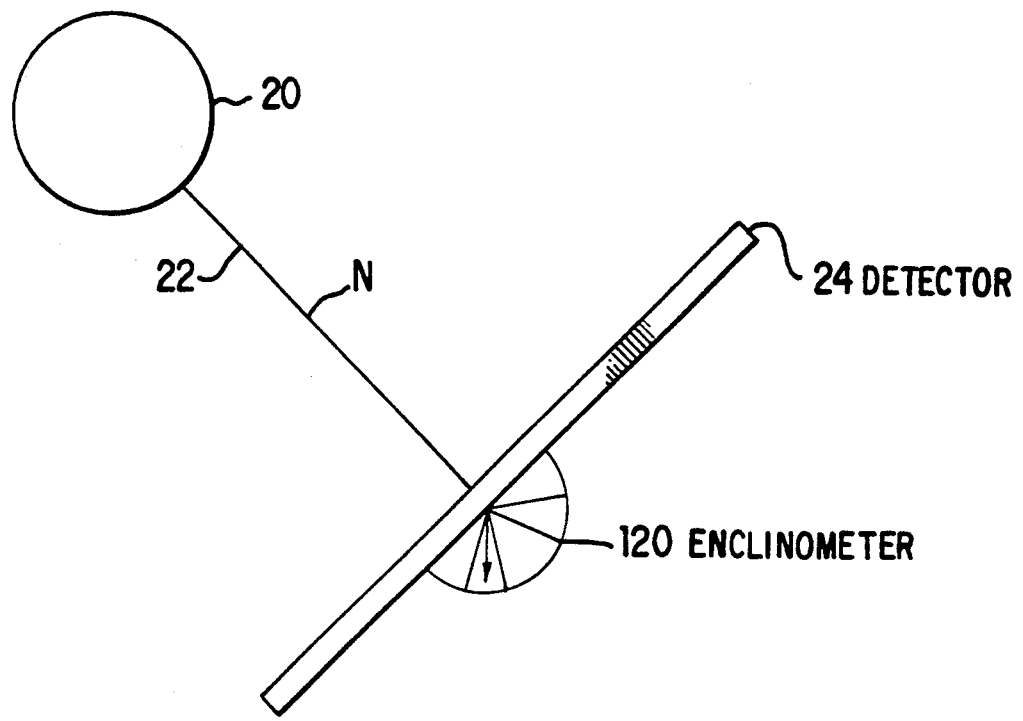

In a first preferred embodiment of the control apparatus, as shown in FIGS. 10, 11a and 11b, the radiation detector means 24 are each provided with an inclinometer 120. The inclinometer 120 measures the inclination of the radiation detector means 24 as measured from a horizontal plane. The inclinometer 120 is connected by conductor 66 to the control means, and provides an output corresponding to the relative angular displacement of the radiation detector means 24 from the horizontal. At the same time, the control apparatus 60 is provided with a non-volatile memory means 60a, which defines a table providing the desired angular inclination of the detector means 24 depending on the current date and time of day. The control means also has a calendar means 60b which provides an output indicative of the current date and time of day. The control means 60 takes the output of the calendar means 60b and determines the desired angular inclination of the radiation detector means 24 from the memory means 60a and supplies it to comparator means 60c. Comparator means 60c also takes the output from the inclinometer 120 representing the actual inclination and produces a signal indicative of the difference between the desired and actual angular inclination of the radiation detector means 24. The control apparatus 60 takes the signal output from the comparator means 60c and outputs control signals to the relays 114 of the pressurizing means and the servo motors 112 of damping means to adjust the angular inclination of the radiation detector means 24.

In a variation of the first embodiment shown in FIG. 11a, the non-volatile memory means 60a has the table of desired angular inclinations of the radiation detector means 24 replaced with a table of desired internal pressures of the support means 30 and 40. Likewise, the output from the inclinometer to the comparator means 60c is replaced with output from the pressure sensor means 62 and 64. In all other respects, the second embodiment performs exactly as the first embodiment.

Figure 12A:
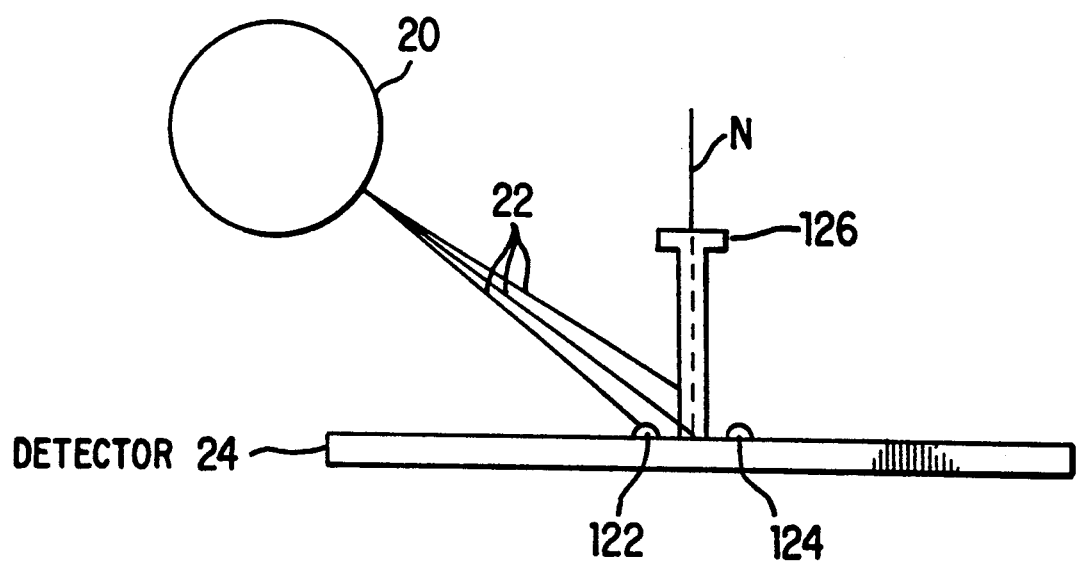
FIGS. 12a and 12b are schematic views of a second embodiment of the control means using a shadow means showing two different angles of incidence.
Figure 12B:
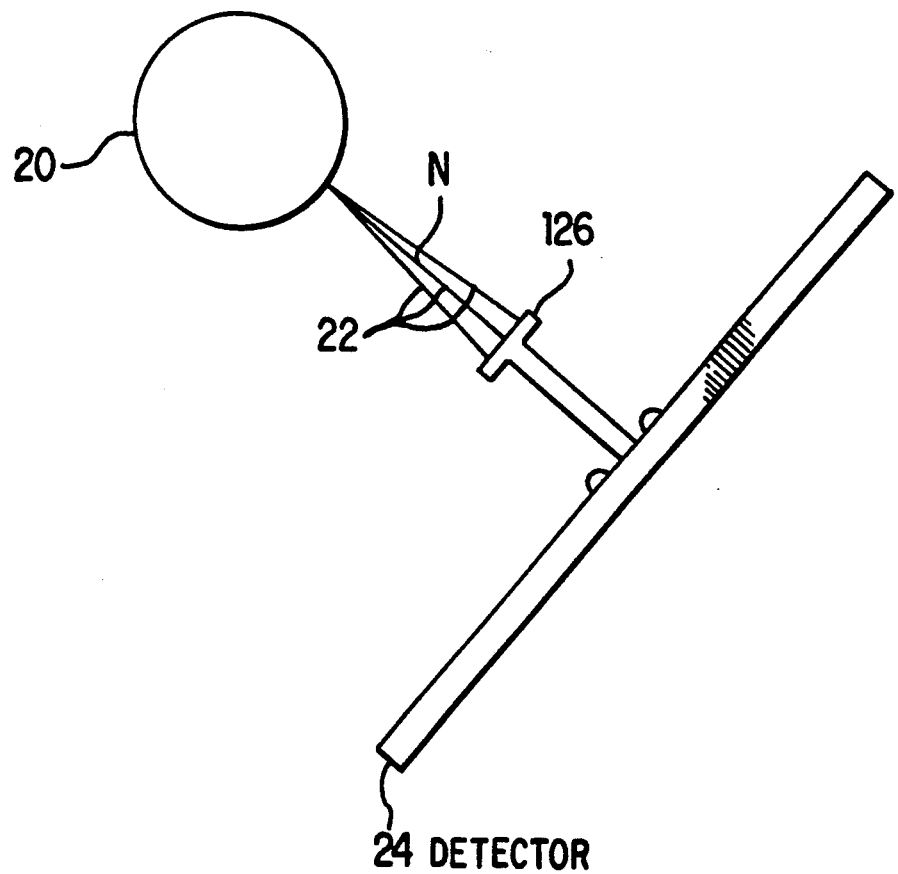
Figure 13A:
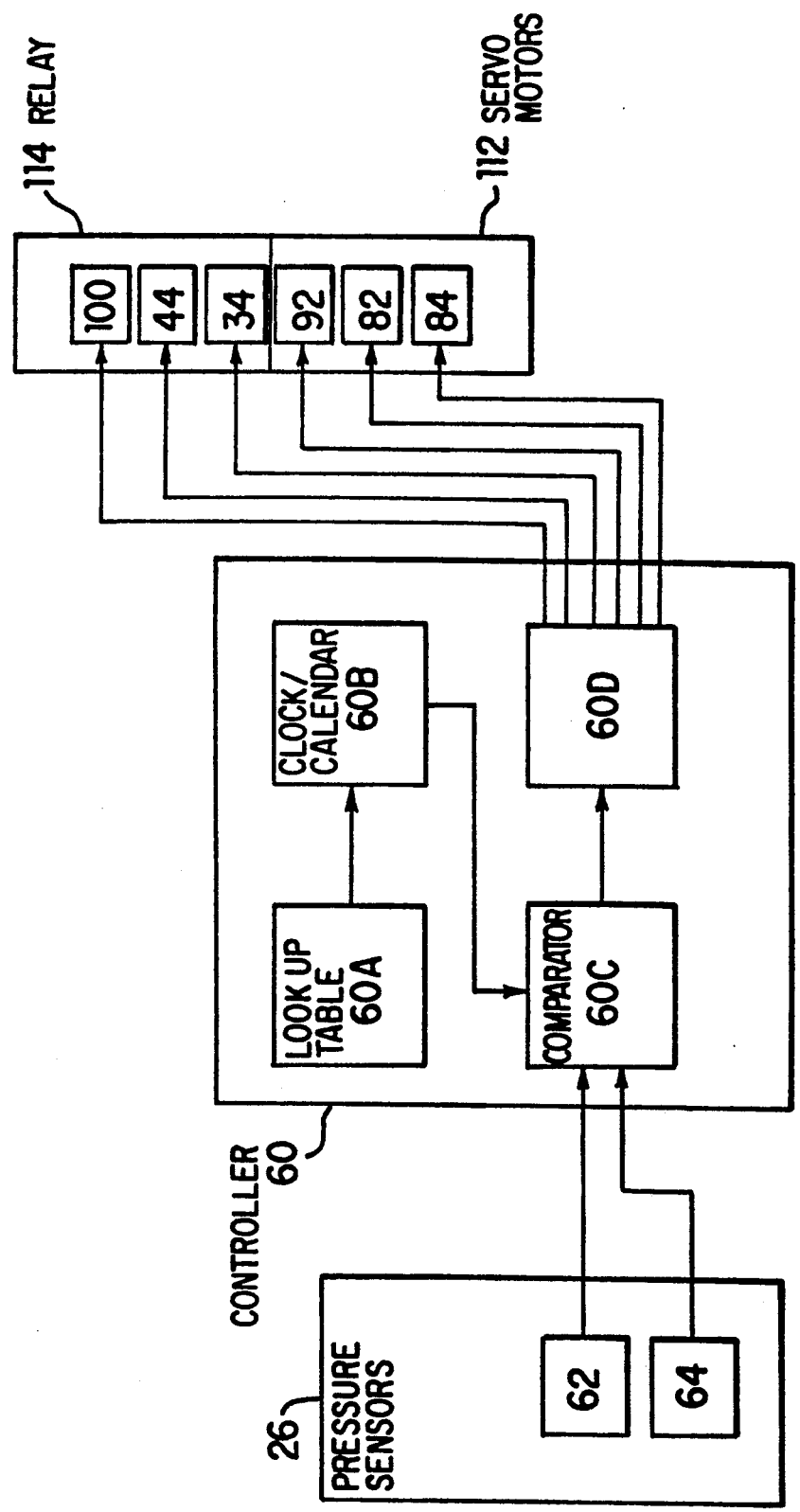
FIGS. 13a and 13b are schematic views of two different embodiments of the control means.
Figure 13B:
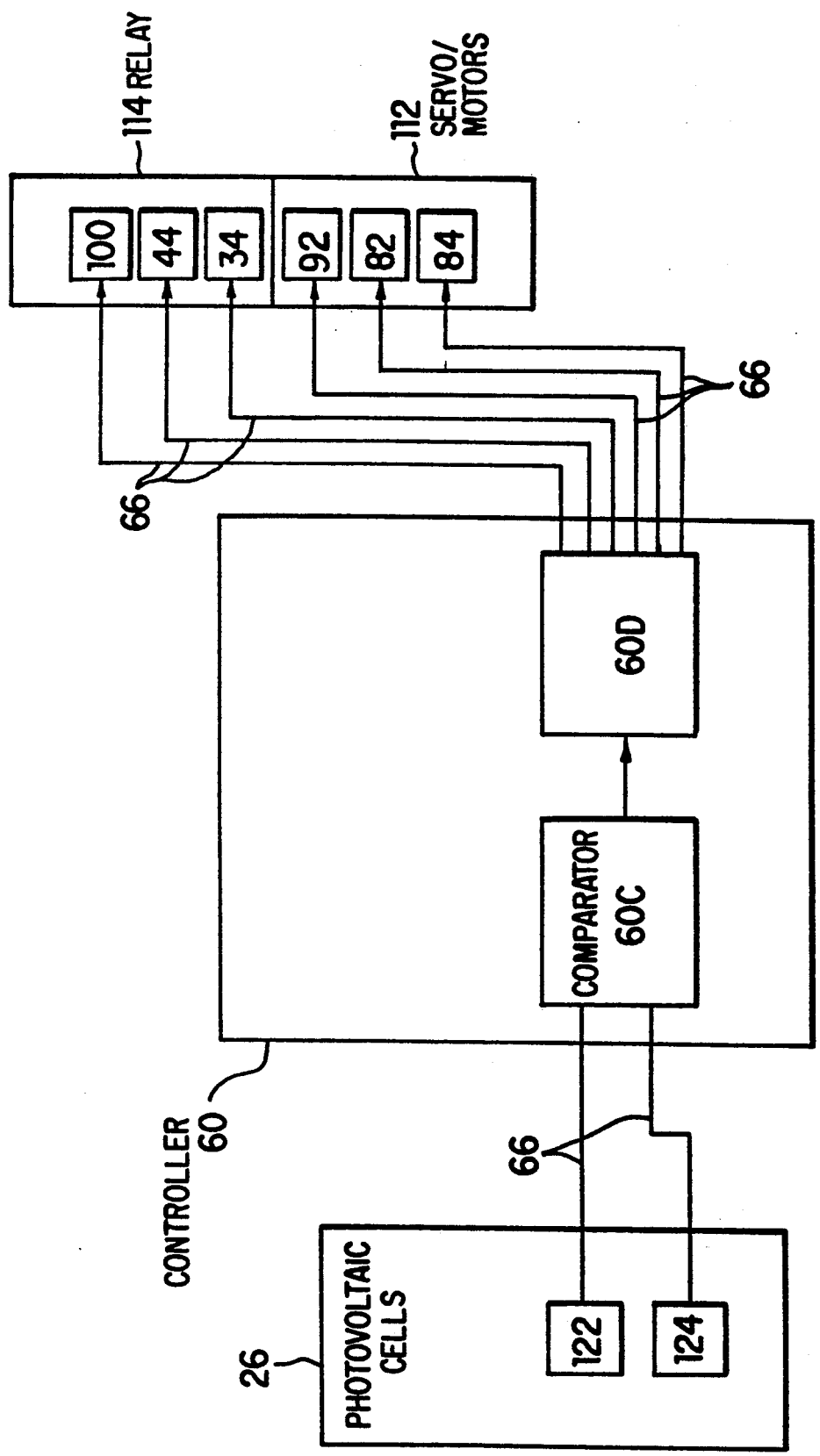

In a second embodiment of the control means shown in FIGS. 13b, 12a and 12b, the memory means 60a is replaced entirely, as is the calendar means 60b. In place of the inclinometer 120, the radiation detector means is provided with a pair of photovoltaic cells 122 and 124 connected by conductor 66 to the comparator means 60c. The signal output by the photovoltaic cells 122 and 124 is proportional to the amount of radiation received by the cells, which is proportional to the amounts of shading of the cells.

Extending above the photovoltaic cells 122 and 124 and in the direction normal to the surface plane of the radiation detector 120 is a shadow means 126. Depending on the present orientation of the radiation detector means with respect to the desired orientation, differing amounts of shadow from the shadow means fall on the photovoltaic cells 122 and 124, as shown in FIG. 12a. When the desired orientation is reached, as shown in FIG. 12b, the amount of shading of the photovoltaic cells 122 and 124 is the same.

Comparator 60c compares the outputs from the photovoltaic cell 122 with the output of photovoltaic cell 124, and provides the control apparatus 60 with an output signal corresponding to the differing amounts of shadow falling on the photovoltaic cells. The control means 60 then operates the pressurizing means relays 114 and the damping means servo motors 112 to minimize the signal output from the comparator means.

Of course, it is understood that the radiation detector means can be supported in a fixed relation to the ground by statically pressurized membranes 30a and 40a, as shown in FIGS. 15 and 16. In this case, the pressurizing means and control means can be omitted, while the statically pressurized support means and anchor means can take any of the embodiments previously discussed.

When used with a fixed, or non-tracking support means, the radiation detector means 24 must be maintained in the fixed relation to ground so that the angle of incidence of the radiation 22 from the radiation source 20 is kept within predetermined limits. By providing membranes 30a and 40a with sufficient structural strength to withstand wind loads and snow loads and to support the load of the radiation detector means 24, the need to provide any guy wires or other additional structural members to maintain the fixed relation is avoided. This provides for a less expensive and more easily maintained support means for the non-tracking radiation detector means. Of course it is contemplated that to provide a sufficient safety factor, in some cases additional structural members may be provided, without going beyond the scope of the present invention.

The operation of the invention will now be described in reference to the embodiments shown in FIGS. 1, 10 and 11a-b. In operation, the support means are initially pressurized to a rest position. As the radiation source, such as the sun, rises to a position along path A where the radiation detector means is able to detect radiation from the radiation source, the pressure within the support means is altered to move the support means from the rest position to an initial operating position.

In a preferred embodiment the rest position is provided by equally pressurizing the support means so that the radiation detector means is approximately horizontal and the contact between the membranes and the ground is minimized. It is important to minimize ground/membrane contact to avoid environmental damage to the support means. Alternatively, a support structure can be provided to keep the support means from resting on the ground while avoiding the stress on the support means due to the pressure therein. Finally, in environments where damage to the support means due to ground contact is unlikely, the support means can be simply depressurized.

When, for example, the sun is low on the horizon, as in the early morning, the radiation detector means 24 is moved from the rest position to the initial position. Assuming that the support means 30 is eastward of the support means 40, the support means 30 is relatively depressurized and the support means 40 is relatively pressurized. As the sun rises, and moves along path A, the angle of incidence on the radiation detector changes. Accordingly the pressure in the support means 30 is raised, by opening the damping means 82 and operating the pressurizing means 34 in a forward direction. Simultaneously, the pressure in the support means 40 may be lowered by opening the damping means 92 and either operating the pressurizing means 40 in a reverse direction, or by simply allowing the pressurized gas in support means 40 to escape.

Figure 17A:
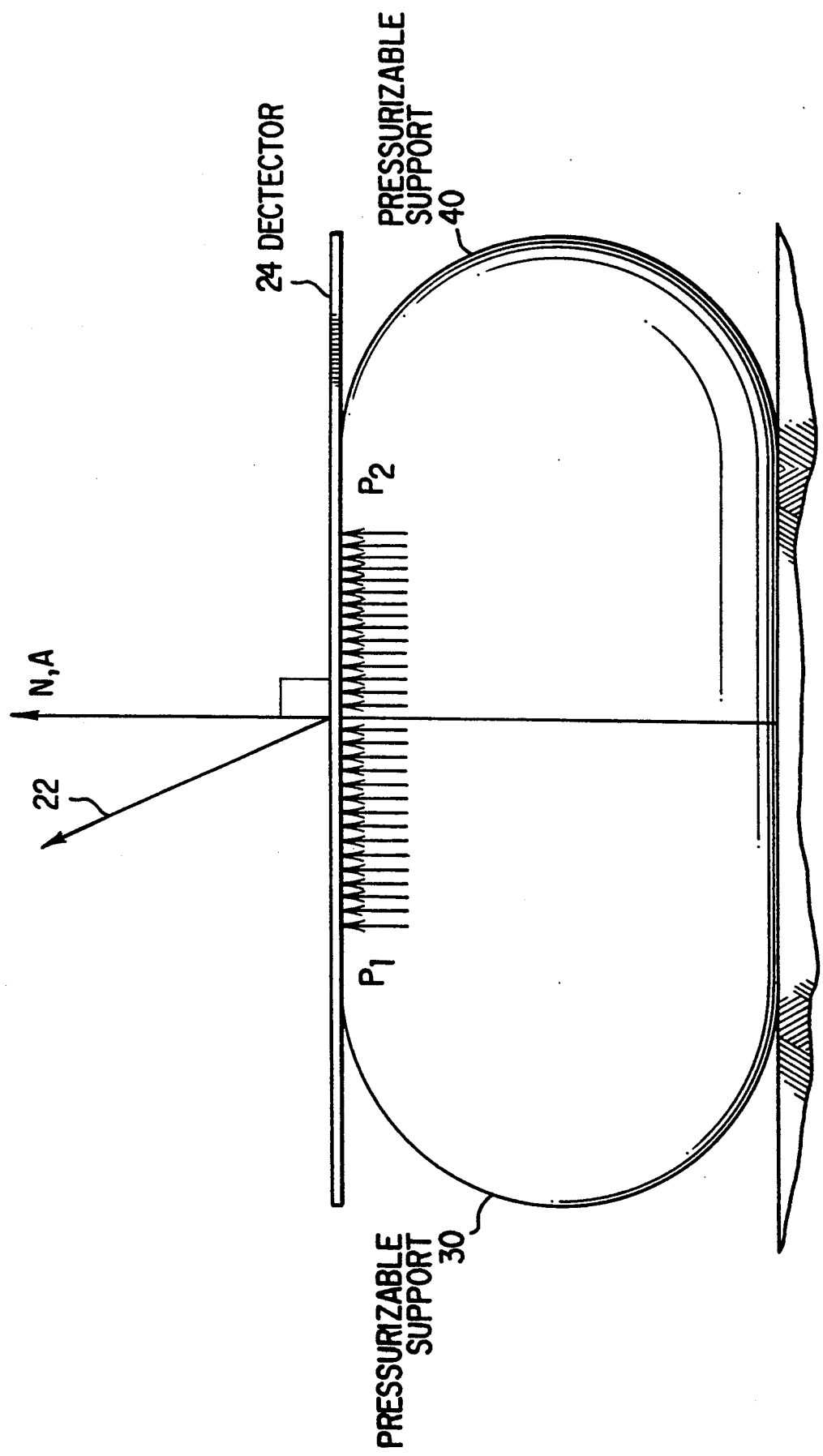
FIGS. 17a and 17b are initial and final positions of the support and tracking apparatus.
Figure 17B:
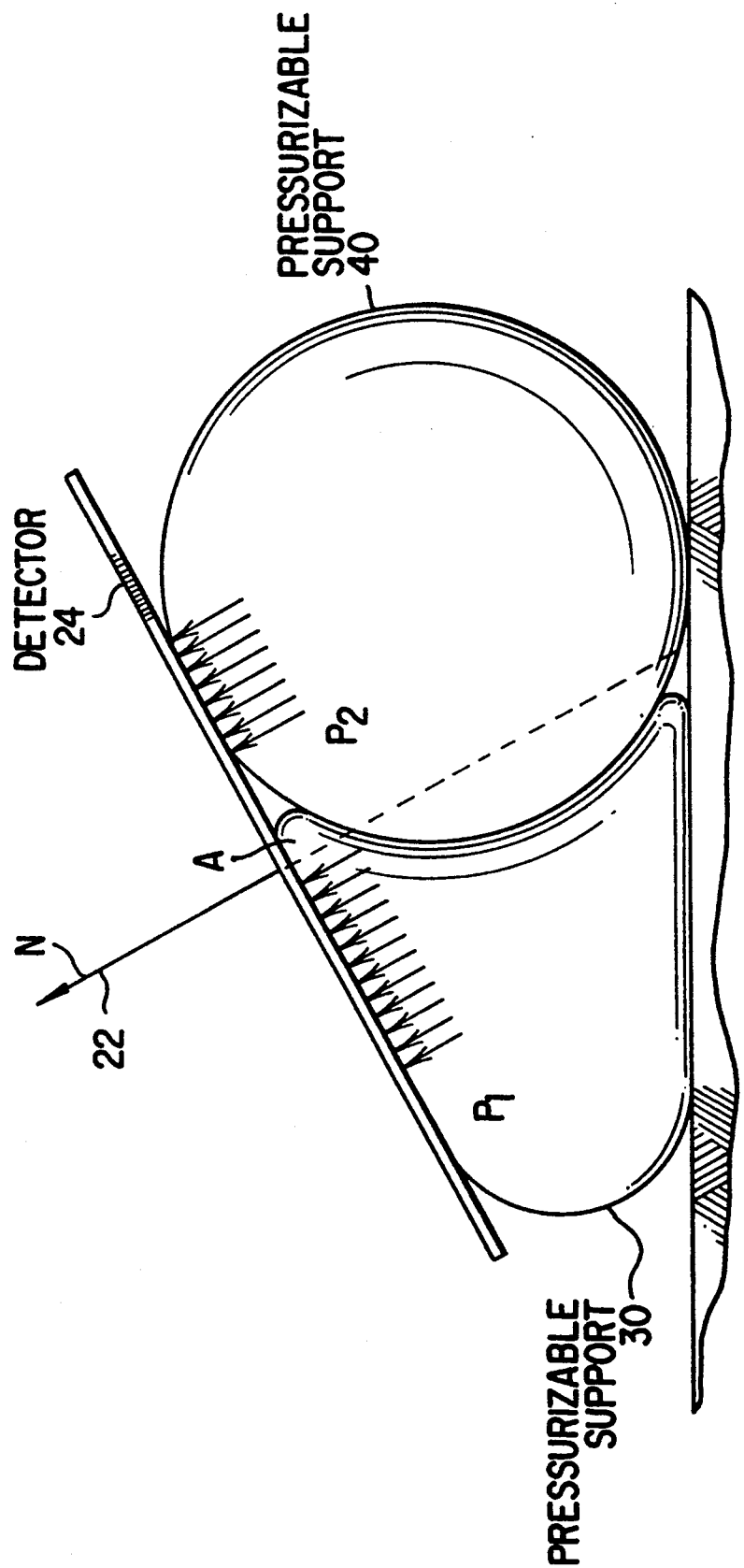

The support means 30 and 40 orient the radiation detector means 24 by a combination of the flexibility of the membrane material and a shifting of the center of mass of the system as shown in FIGS. 17a and 17b. In the position shown in FIG. 17a, center of mass of the radiation detector lies vertically above axis D. Accordingly, the net moment about axis D of that part of the load of radiation detector means 24 supported by membrane 30 having an internal pressure of P1 is exactly balanced by the net moment about axis D of that part of the load of radiation detector means 24 supported by the membrane 40 having an internal pressure P2. As membrane 30 is relatively depressurized, the center of mass of the system shifts around the axis D toward the relatively depressurized membrane 30. As pressure P1 is reduced, the net moment about axis D is unbalanced in favor of the counterclockwise moment of membrane 40 and the radiation detector means 24 is rotated towards membrane 30, as shown in FIG. 17b. The part of the load and the area of radiation detector means 24 supported by membrane 30 rises (and the part of the load and the area supported by membrane 40 drops) until the net moment about axis D from membrane 40 is once again balanced by the net moment about axis D from membrane 30. Accordingly, the system reaches a new equilibrium state wherein the radiation detector has relatively more of its area and mass supported by the relatively depressurized membrane 30, and relatively less of its area and mass supported by the relatively pressurized membrane 40, thereby reorienting the radiation detector means 24 on the radiation source. It is recognized that this support and orientation means is effective for radiation detection means of any weight or rigidity, including essentially weightless or non-rigid radiation detection means.

It is also important to properly size the radiation detector means 24 to the membranes 30 and 40. If the membrane is too large, the membrane will wrap over the face of the radiation detector when relatively depressurized, thereby partially occluding the radiation detector. Alternatively, if the radiation detector is too large, it may contact the ground as one membrane is relatively depressurized, thereby preventing proper orientation on the radiation source. As is well known in the art, the efficiency of radiation detectors is highly sensitive to the angle of incidence any to any occlusion of the radiation detector that might occur. An ability to rotate at least approximately 45° from vertical in each direction is critical in providing a useable tracking system.

The control means 60 controls the opening and closing of the damping means 82 and 92 by means of a plurality of servo motors 112, and controls the operation and direction of pressurizing means 34 and 44 by means of a plurality of relays 114. In the first embodiment of the control apparatus, the actual angle of incidence is measured by an inclinometer, which determines the angle of inclination of the radiation detector from the horizontal, as shown in FIG. 11a. The control means 60 is also supplied with a data table stored in memory 60a, and a clock/calendar means 60b. The control means 60 determines actual time and day data from the clock/calendar means, and uses the time and day data to look up the desired radiation source angle of inclination from the data table for the actual time and day to generate a desired angle of inclination signal. The control means 60 inputs the radiation detector means angle of inclination signal from the inclinometer 120, and transfers both angle of inclination signals to the comparator 60c. The comparator 60c compares the angle of inclination signals, and generates an error signal proportional to the difference between the signals. The control means 60 generates control signals to the damping means servo motors 112 and the pressurizing means relays 114.

For example, in the morning the sun moves from the horizon towards a position overhead. Accordingly, the actual angle of inclination of the radiation detection means is greater than the desired angle of inclination. Therefore, the control means 60 generates control signals to the appropriate servo motor to open the damping means 82 and to the appropriate relay 114 to operate the pressurizing means 34 in a forward direction to raise the pressure in the support means 30, thereby altering the pressures within the support means 30 and 40 to the state shown in FIG. 2, which corresponds to a noon time position of the radiation source.

In the second embodiment of the control means 60 shown in FIG. 13b, the inputs to the comparator 60c are generated by the shadow means and the photovoltaic cells. As the radiation source travels along path A, the shadow from the shadow means 126 moves, causing one cell 124 to be relatively shaded and the other cell 122 to be relatively unshaded. The signals output by the cells 122 and 124 to the comparator 60c are proportional to the amount of shade each receives.

Other modifications and variations to the invention will be apparent to those skilled in the art from the foregoing disclosure and teachings. It is therefore to e understood that within the scope of the appended claims, the invention may be practiced otherwise than as specifically described. Thus, while only certain embodiments of the invention have been specifically described herein, it will be apparent that numerous modifications may be made thereto without departing from the spirit and scope of the invention.

What is claimed is:

1. A method for tracking a moving radiation source having a known motion with at least one radiation detector means for detecting radiation from the radiation source by minimizing an angle of incidence of radiation on each detector means, comprising the steps of:
   (a) supporting each detector means at a variable angle on at least one pneumatically inflatable detector support means, each at least one pneumatically inflatable detector support means having an internal pressure;
   (b) determining an actual angle of incidence of the radiation on the radiation detector means; and
   (c) selectively varying the internal pressure of each at least one pneumatically inflatable detector support means in response to the actual angle of incidence to change the variable angle to minimize the angle of incidence.

2. The method of claim 1, wherein the step of determining the actual angle of incidence further comprises the step of determining a radiation source location and a radiation detector orientation.

3. The method of claim 2, wherein the step of determining the radiation source location comprises determining a time and a day and correlating the time and day to a corresponding known radiation source location.

4. The method of claim 2, wherein the step of determining the radiation detector orientation comprises determining a detector angle of inclination.

5. The method of claim 2, wherein the step of determining the radiation detector orientation comprises determining the internal pressure of each at least one radiation support means.

6. The method of claim 1, wherein the step of determining the actual angle of incidence comprises comparing outputs of a plurality of variably shadeable photoelectric cells.

7. The method of claim 1, wherein the step of selectively varying the internal pressure of the at least one pneumatically inflatable detector support means comprises independently inflating each at least one pneumatically inflatable detector support means.

8. The method of claim 7, wherein the step of selectively varying the internal pressure of the at least one pneumatically inflatable detector support means further comprises connecting a plurality of pneumatically inflatable detector support means to a common inflating means.

9. The method of claim 7, wherein the step of selectively varying the internal pressure of the at least one pneumatically inflatable detector support means further comprises connecting all the pneumatically inflatable detector support means to a common inflating means.

10. The method of claim 1, wherein the step of selectively varying the internal pressure of the at least one pneumatically inflatable detector support means comprises connecting a plurality of pneumatically inflatable detector support means to a first common inflating means.

11. The method of claim 10, wherein the step of selectively varying the internal pressure of the at least one pneumatically inflatable detector support means further comprises connecting all the pneumatically inflatable detector support means to a second common inflating means.

12. The method of claim 1, wherein the step of selectively varying the internal pressure of the at least one pneumatically inflatable detector support means comprises connecting all the pneumatically inflatable detector support means to a common inflating means.

13. The method of claim 1, wherein the step of selectively varying the internal pressure of the at least one pneumatically inflatable detector support means includes minimizing the angle of incidence such that the angle of incidence of the radiation on each radiation detector means is substantially equal to zero.

14. A radiation source tracking apparatus for tracking a moving radiation source, comprising:
   at least one radiation detector means for detecting radiation from the radiation source;
   at least one variably pneumatically inflatable detector support means for supporting one of the at least one radiation detector means, each at least one pneumatically inflatable detector support means having an internal pressure;
   anchoring means for securing each at least one pneumatically inflatable detector support means;
   inflating means for selectively varying the internal pressure of each at least one pneumatically inflatable detector support means; and
   control means for controllably inflating each at least one inflatable detector support means to orient the at least one radiation detector means on the radiation source at a minimum angle of incidence.

15. The apparatus of claim 14, wherein the minimum angle of incidence is substantially equal to zero.

16. The apparatus of claim 14, wherein the pneumatically inflatable support means further comprises cylindrical, variably pneumatically inflatable membranes.

17. The apparatus of claim 16, wherein the radiation detector means is supported on a longitudinal axis of the cylindrical pneumatically inflatable support means.

18. The apparatus of claim 16, wherein the radiation detector means is supported on a radial axis of the cylindrical pneumatically inflatable support means.

19. The apparatus of claim 14, wherein the pneumatically inflatable support means further comprises spherical variably pneumatically inflatable membranes.

20. The apparatus of claim 14, wherein the pneumatically inflatable support means further comprises an open, sheet-like membrane; and the anchoring means further comprises a footing, wherein edges of the membrane are sealably attached to the footing.

21. The apparatus of claim 20, wherein the open membrane has a hemispherical shape.

22. The apparatus of claim 20, wherein the open membrane has a semi-cylindrical shape.

23. The apparatus of claim 14 wherein the pneumatically inflatable support means has a plurality of independently inflatable chambers therein.

24. The apparatus of claim 14, wherein the inflating means further comprises:
independent inflating means for independently inflating each support means;
at least one independent deflating means for independently protecting each inflating means and pneumatically inflatable support means from over-pressurization; and
damper means for opening and closing each inflating means.

25. The apparatus of claim 24, wherein the inflating means further comprises a plurality of common inflating means each connected to a plurality of support means; means for connecting a plurality of pneumatically inflatable support means to one of the plurality of common inflating means; and damper means for opening and closing the connecting means.

26. The apparatus of claim 14, wherein the inflating means further comprises common inflating means connected to all the pneumatically inflatable support means; means for connecting the at least one pneumatically inflatable support means to the common inflating means; and damper means for opening and closing the connecting means.

27. The apparatus of claim 14, wherein the inflating means further comprises:
common inflating means for a plurality of pneumatically inflatable support means;
means for connecting the common inflating to the plurality of pneumatically inflatable support means;
a plurality of first damping means for opening and closing the connecting means between each first common inflating means and the plurality of pneumatically inflatable support means; and
second damping means for opening and closing the connecting means between the plurality of pneumatically inflatable support means and atmosphere.

28. The apparatus of claim 27, wherein the inflating means further comprises second common inflating means connected to all the pneumatically inflatable support means, and third damper means for opening and closing the connecting means between the second inflating means and the pneumatically inflatable support means.

29. The apparatus of claim 14, wherein the inflating means further comprises common inflating means connected to all the pneumatically inflatable support means, means for connecting the inflating means to the pneumatically inflatable support means and damper means for opening and closing the connecting means between the inflating means, the pneumatically inflatable support means and atmosphere.

30. The apparatus of claim 29, wherein the control apparatus further comprises:
pressure sensor means provided in each support means and electrically connected to the control means for measuring internal pressure in the support means;
means for controlling the inflating means and the damper means in response to the internal pressure; and
means for determining an actual angle of incidence and varying the internal pressure to obtain the minimum angle of incidence.

31. The apparatus of claim 30, wherein the actual angle of incidence determination means further comprises clock means for determining a day and a time.

32. The apparatus of claim 30, wherein the actual angle of incidence determination means further comprises:
at least two photovoltaic generation means for generating an output dependent on the radiation incident thereon;
shadow means for casting a shadow on the generation means;
and comparison means for comparing the outputs of the generating means and outputting a control signal to the control means.

33. The apparatus of claim 14, wherein the control apparatus further comprises:
pressure sensor means provided tin each pneumatically inflatable support means and electrically connected to the control means for measuring internal pressure in the pneumatically inflatable support means;
damper means for controllably connecting the pneumatically inflatable support means to at least one of the inflating means and atmosphere;
means for controlling the inflating means and the damper means in response to the internal pressure; and
means for determining an actual angle of incidence and varying the internal pressure to obtain the minimum angle of incidence.

34. The apparatus of claim 33, wherein the actual angle of incidence determination means further comprises clock means for determining a day and a time.

35. A radiation detector support apparatus, comprising:
a radiation detector means for detecting radiation from a radiation source; and
a pneumatically inflatable radiation detector support means for supporting the radiation detector means in a fixed relation to ground,
wherein said pneumatically inflatable support means comprises at least one flexible inflatable membrane having a predetermined internal pressure and an anchor means for securing the pneumatically inflatable support membrane to the ground,
the at least one membrane having sufficient structural strength to withstand a load of the radiation detector means and a load from environmental forces such that no additional structure members are necessary to maintain the radiation detection means in the fixed relation to ground.

* * * * *